US012762334B1

(12) United States Patent
Blackman et al.

(10) Patent No.: US 12,762,334 B1
(45) Date of Patent: Oct. 13, 2026

(54) ARTIFICIAL INTELLIGENCE ASSISTED GENERATION AND EDITING OF SPREADSHEETS

(71) Applicant: OpenAI OpCo, LLC, San Francisco, CA (US)

(72) Inventors: Jonathan Blackman, Redwood City, CA (US); Victoria Gong, San Francisco, CA (US); Roberto Martinez Stocker, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/569,778

(22) Filed: Mar. 17, 2026

(51) Int. Cl.
*G06F 40/18* (2020.01)
*G06F 40/103* (2020.01)
*G06F 40/40* (2020.01)
*G06V 30/412* (2022.01)

(52) U.S. Cl.
CPC ............ *G06F 40/18* (2020.01); *G06F 40/103* (2020.01); *G06F 40/40* (2020.01); *G06V 30/412* (2022.01)

(58) Field of Classification Search
CPC .... G06F 40/18; G06F 3/0482; G06F 3/04847; G06F 40/106; G06F 40/237; G06F 40/274; G06F 3/04842; G06F 3/14; G06F 40/205; G06F 8/427; G06F 16/148; G06F 16/2228; G06F 16/24573; G06F 8/33; G06F 9/453; G06F 16/2246; G06F 16/2255; G06F 16/2282; G06F 16/252; G06F 16/285; G06F 16/90344; G06F 3/0481; G06F 40/111; G06F 40/194; G06F 40/284; G06F 16/2456; G06F 17/10; G06F 18/241; G06F 3/04817; G06F 3/04845; G06F 3/04883; G06F 3/162; G06F 3/165; G06F 40/177; G06F 40/197; G06F 9/451; G06F 11/00; G06F 9/00; G06F 8/00; G06F 7/00; G06F 5/00; G06F 3/00; G06F 1/00; G06F 12/00; G06F 13/00; G06F 15/00; G06F 16/00; G06F 17/00; G06F 18/00
See application file for complete search history.

(56) References Cited

U.S. PATENT DOCUMENTS

| | | | | |
|---|---|---|---|---|
| 2020/0034415 | A1* | 1/2020 | Gordon | G06F 40/18 |
| 2021/0232537 | A1* | 7/2021 | Nag | G06F 16/168 |
| 2023/0351194 | A1* | 11/2023 | Wright | G06F 16/285 |

* cited by examiner

*Primary Examiner* — Rayeez R Chowdhury
(74) *Attorney, Agent, or Firm* — Polsinelli PC

(57) ABSTRACT

The present technology pertains to a generative response engine receiving, from a user interface, a prompt that defines an agentic task to compose a spreadsheet content item. The agentic task is one in which the generative response engine performs an action as an agent of a user account and the action involves using a spreadsheet tool. The generative response engine composes the spreadsheet content item by invoking one or more high-intent operations that are provided to the spreadsheet tool. The one or more high-intent operations specify respective semantic editing operations for spreadsheets that correspond to human user editing actions. The generative response engine iteratively repeats invoking of the one or more high-intent operations until the agentic task is complete.

20 Claims, 17 Drawing Sheets

ARTIFICIAL INTELLIGENCE ASSISTED GENERATION AND EDITING OF SPREADSHEETS

TECHNICAL FIELD

The present disclosure broadly relates to artificial intelligence agents that perform tasks on behalf of users, and more particularly, to authoring spreadsheet artifacts.

BACKGROUND

Computer agents can analyze vast amounts of data, automate repetitive actions, and respond intelligently to specific triggers. For instance, a person might use a computer agent to monitor stock prices and execute trades, schedule and manage appointments, or sift through extensive datasets to find trends or anomalies. Computer agents can act on behalf of a person to perform tasks to save time, enhance efficiency, and reduce the cognitive burden of managing complex or mundane tasks.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
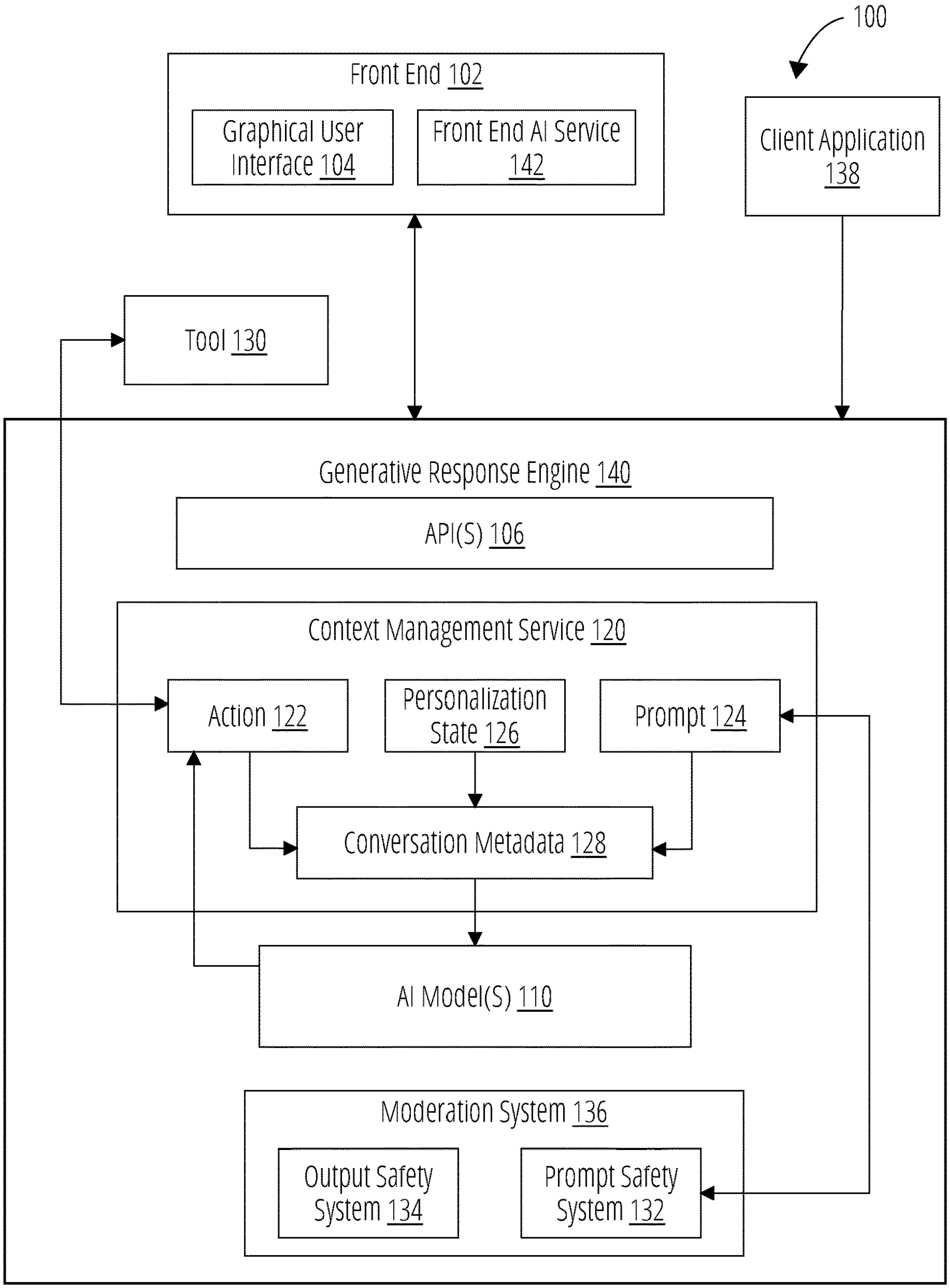
FIG. 1 is a diagram illustrating an example system supporting a generative response engine during inference operations in accordance with some aspects of the disclosure.

Spreadsheets are widely used for structured analysis, forecasting, reporting, and decision support. Modern spreadsheet workbooks (e.g., in XLSX format) can include multiple worksheets and numerous cell-level attributes, including values, formulas, number formats, styles, borders, column widths, row heights, comments/notes, and other presentation constructs. As a result, programmatic spreadsheet generation or modification is typically performed using specialized software libraries or file-format toolchains rather than simple text manipulation.

Automated spreadsheet workflows commonly fall into at least two categories. In a first category, systems generate tabular outputs as plain text or comma-separated values (CSV) and rely on a user to import the data into a spreadsheet application and manually apply structure, formulas, and styling. In a second category, systems attempt direct programmatic creation or editing of XLSX workbooks using general-purpose libraries (e.g., libraries that construct or modify Office Open XML structures). However, XLSX files are effectively compressed packages of XML parts, which are structurally complex and can be awkward to manipulate and validate programmatically, particularly when the desired output must preserve a professional spreadsheet layout and be easily editable by humans.

More recently, generative models have been applied to "agentic" spreadsheet tasks in which the generative models or a generative response engine is expected to act on a user's behalf e.g., "build a 5-year DCF model and put it in a spreadsheet" by using tools to create or modify spreadsheet files. Such tasks are inherently more structured than typical text generation, because correctness depends not only on textual content but also on formula semantics, cell referencing, formatting, layout, and interaction conventions expected by experienced spreadsheet users.

In general, a generative response engine is configured to accept multimodal inputs and can be trained to understand visual changes and could implement a computer agent, which is an autonomous software program designed to perform tasks, make decisions, or provide insights on behalf of a user. Computer agents can analyze vast amounts of data, automate repetitive actions, and respond intelligently to specific triggers. For instance, a person might use a computer agent to monitor stock prices and execute trades, schedule and manage appointments, or sift through extensive datasets to find trends or anomalies. Additionally, computer agents or agentic systems may create office artifacts for a person. Agentic systems may create Excel files by driving desktop applications (e.g., LibreOffice) or by calling third-party libraries that emit Open Extensible Markup Language (XML) e.g., excel open XML spreadsheet format (XLSX).

However, Open XML is verbose and is not designed for artificial intelligence (AI) model consumption. Large language models (LLMs) struggle with spreadsheet artifacts. Asking the AI model to read or write these spreadsheet artifacts directly requires huge token budgets and leads to brittle behavior and frequent file corruption or "repair" dialogs in spreadsheet applications.

Despite the availability of spreadsheet libraries and agent toolchains, related art techniques exhibit several practical deficiencies when used for generative, agentic spreadsheet creation and editing. One of the challenges with spreadsheets specifically is that they often include hidden context that is not specified in the prompt. For example, implied expectations may be generate XLSX (not CSV), use spreadsheet formulas for derived values (not hardcoded numbers), apply professional number formats, visually distinguish inputs from calculations, and include source citations. In other words, it is not just put numbers in cells. If an agent is prompted to build a five-year discounted cash flow (DCF) model for an enterprise A, the generative response engine needs to understand that the results are to be presented in spreadsheets, excel formulas should be used, and it should be properly formatted (e.g., using XLSX format). Often times, hidden-context requirements are not reliably satisfied. Generative systems that do not reliably internalize these conventions tend to produce outputs that require substantial manual cleanup and verification.

As another example, formula correctness is difficult to validate without an explicit evaluation step. In related art, programmatic spreadsheet generation frequently produces workbooks containing formula defects (e.g., invalid references, divide-by-zero, name errors) that may not be detected until the workbook is opened in a spreadsheet application. In many libraries, formula results are not evaluated or cached by default, and correctness verification becomes an external, manual step. This creates a poor user experience, especially when a generative model is instructed to "use formulas" but the delivered workbook contains calculation errors.

Additionally, in related art, spreadsheet quality cannot be reliably verified from object models alone. Spreadsheet usability depends heavily on layout and formatting e.g., titles, headers, borders, spacing, column widths, row heights, and readable alignment. Conventional pipelines that operate only through programmatic object inspection provide limited assurance that the final spreadsheet "looks right" to a human. Without a reliable visual validation mechanism, the generative response engine may generate a technically structured workbook that is still difficult to read, inconsistent in formatting, or professionally unacceptable.

Also, editing existing workbooks risks breaking established formatting and semantics. Many real-world scenarios require modifying an existing spreadsheet template or report. Conventional approaches may inadvertently overwrite established formatting, disrupt references, or introduce subtle misalignments in number formats and layout when inserting or changing values and formulas. The need to preserve existing style while making precise modifications increases the complexity of safe automated edits. Adding on to this editing challenge, a generative response engine may not consistently follow tool/skill guidance without targeted training. Even where a tool interface and best-practices guidance exist (e.g., "recalculate formulas before rendering," "avoid unsupported function classes," "use citations inside the spreadsheet"), model behavior can be inconsistent. As an example, models may omit verification steps, fail to follow formatting conventions, or neglect to apply required constraints unless strongly prompted and trained to do so. This inconsistency reduces reliability and increases the need for human review.

Accordingly, there is a need for improved techniques that enable agentic spreadsheet generation and editing to be structurally correct (formulas and references), visually and professionally formatted, verifiable through automated recalculation and visual inspection, and consistently aligned with spreadsheet-specific constraints and best practices rather than ad hoc prompting.

The present technology introduces an intermediate spreadsheet representation that a generative response engine is trained/finetuned to read/write. A spreadsheet artifact tool renders and previews the intermediate spreadsheet representation, handles granular edits (formulas, formatting, charts), and supports full import/export to common formats. The intermediate spreadsheet representation enables precise, low-latency editing, richer transformations, and robust collaboration entirely within the chat environment while preserving external compatibility.

Specifically, the present technology collects results, uses excel formulas and not hard-coded numbers, formats the spreadsheet (not just dumps numbers into a CSV but converts them into an XLSX format), uses appropriate number formats, and cites sources. Spreadsheet editing is not plain text editing but a manipulation of worksheets, ranges, cells, and their properties. The present technology introduces a generative response engine configured to render an image of a spreadsheet so that the generative response engine may visually verify layout readability, borders or format, to confirm that it looks like a professional spreadsheet. The generative response engine fixes errors and calculation issues before returning the spreadsheet. Training involves a change log sheet that indicates changes made with grading.

In some aspects, the present technology provides a spreadsheet-focused editing in which editing a spreadsheet is performed using a spreadsheet tool and high intent function calls that relate to sheets, cells, and ranges. A high intent function calls specifies a semantic editing operation that corresponds to a human user editing action that is easier for an agent to make and the user to understand.

In some aspects, the present technology provides a formula recalculation loop in which the agent sets formulas, then recalculates cells, inspects (including visual inspection), and then detects or fixes formula errors. That is, formulas are viewed as a core spreadsheet primitive, which are written, recalculated, and asserted against expected numeric results.

In some aspects, the present technology provides spreadsheets specific training. For example, a training workflow ("artifact teacher" or "teacher model") plus grader and skill-variant compliance checks (change log) are used to make a generative response engine consistently follow the policy and use the spreadsheet tooling based on strong prompting (including recalculations and rendering rather than ignoring it). Using the teacher model with heavy prompts during training allows for accurate spreadsheets without a need for forced prompting at inference time.

In some embodiments, the present technology introduces a spreadsheet artifact tool that operates on an internal spreadsheet representation rather than manipulating XLSX's zipped XML structures directly. The internal spreadsheet representation includes worksheets, cells, cell ranges, formulas, and cell formatting attributes as addressable objects suitable for programmatic access and editing by a generative response engine. This internal spreadsheet representation enables the generative response engine to perform "high-intent" operations (e.g., set values over a range, set formulas over a column, apply styles/conditional formatting, merge ranges, adjust row heights and column widths) that correspond to meaningful spreadsheet edits and may be recorded and translated into human-readable change descriptions.

In some embodiments, the present technology introduces spreadsheet-native verification primitives that the generative response engine may invoke as part of an iterative "check-and-fix" workflow. In particular, a spreadsheet artifact tool supports formula recalculation including automatic recalculation upon edits and an explicit recalculation operation to evaluate spreadsheet formulas and surface calculation defects and rendering of a workbook, worksheet, or range into one or more images that depict the spreadsheet's layout and formatting. Using these primitives, the generative response engine may validate correctness and presentation before delivering an output file e.g., after making edits, the formul as are recalculated, errors detected and corrected (e.g., reference defects and divide-by-zero conditions), and sheet imagery is rendered to visually confirm professional formatting, readability, and consistent styling. In some embodiments, stored spreadsheet-specific constraints (spreadsheet skill or policy) guide both construction and verification of spreadsheets. Example constraints include using formulas for derived values, avoiding unsupported or undesirable function classes (e.g., dynamic array functions and volatile functions), producing human-editable formulas (e.g., short/legible formulas with helper cells where necessary, avoiding "magic numbers" by referencing input cells), applying suitable number formats and layout conventions, preserving existing formatting when editing pre-styled spreadsheets, and embedding citations/provenance information within the workbook (e.g., via cell comments or adjacent citation columns). These constraints may be used both as runtime requirements for agent behavior and as grading criteria for training and evaluation.

In some embodiments, the present technology introduces a training pipeline configured to improve a model's proficiency and reliability in spreadsheet agent tasks. A teacher model is prompted with an augmented instruction to access and follow the spreadsheet constraints while performing spreadsheet creation/editing with tool calls. Generated tool-using trajectories are graded for constraint compliance (including verification behaviors such as recalculation and rendering), and selected high-scoring trajectories are transformed (e.g., by removing the augmented instruction) to train a student/prior model such that the student model learns to follow spreadsheet constraints without relying on heavy prompting at inference time. To mitigate memorization and encourage robust constraint following, variants of the constraint set (e.g., variants requiring a change log worksheet and corresponding entries) may be generated and enforced, and trajectories graded accordingly. Additionally, synthetic training tasks may be generated from gold spreadsheets by producing broken or incomplete starting spreadsheets, task prompts, and grading rubrics, and then using a separate grader model to score outputs, enabling scalable, data-efficient improvement as more high-quality spreadsheets become available.

The present technology provides a round-trip path between internal and external spreadsheet formats. The generative response engine may import an existing workbook into the internal spreadsheet representation, inspect structure and effective formatting, apply high-intent edits, recalculate and visually validate, and then export an updated XLSX workbook suitable for end-user consumption. By integrating formula evaluation, image-based validation, and policy-driven construction into the agent's workflow, the reliability and usability of automatically produced spreadsheets may be improved, human rework may be reduced, and consistent adherence to professional spreadsheet conventions across diverse tasks and templates may be enabled.

FIG. 1 is a diagram illustrating an example AI assistant service 100 supporting a generative response engine during inference operations in accordance with some aspects of the disclosure. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

AI model(s) 110 are artificial intelligence (AI) models that can generate content in response to a prompt. The prompt can be from a human or a software entity (AI or applications, such as client application 138). The prompt is generally in natural language but could be in code, including binary. Some examples of AI model(s) 110 can include language models that generate language, such as CHATGPT, or other models, such as DALL-E or IMAGEGEN, which generate images, and SORA, which generates videos. CHATGPT, DALL-E, IMAGEGEN, and SORA are all provided by OPENAI, but the AI model(s) 110 are not limited to AI provided by OPENAI. AI model(s) 110 can also be any type of generative AI and can include AI developed using various architectures such as diffusion models and transformers (e.g., autoregressive transformer architecture) and combinations of models. Some AI models are multi-modal models which can receive and output data in text, image, audio, etc.

In some instances, a language model, such as CHATGPT, can receive prompts to output images, video, code, applications, etc., which it can provide by interfacing with one or more other models, as will be addressed further herein.

AI model(s) 110 may be part of a generative response engine 140, where generative response engine 140 may include one or more components for supporting interaction with AI model(s) 110. Users can interact with generative response engine 140 through a front end 102 and applications can interact with generative response engine 140 through APIs 106. Front end 102 serves as the interface and intermediary between the user and generative response engine 140. It encompasses a graphical user interface 104 which may be used to provide input that facilitate communication with generative response engine 140 and AI model(s) 110. Generally, users interact through the graphical user interface 104 that often includes a conversational interface, and applications interact through the API 106, but this is not a requirement.

While some components are shown as being part of generative response engine 140 and some are outside of generative response engine 140, this is for illustration purposes only and some components such as tool 130 might be part of generative response engine 140, and some components such as moderation system 136 might be outside of generative response engine 140. As used herein, generative response engine 140 encompasses deterministic services that are first-party services that prepare prompts to be sent to AI models, that are primitive level services that AI model(s) 110 can utilize to generate a response to a prompt. Services that are outside of generative response engine 140 are logically separate. For example, front end 102 might be a first-party front end (provided by the same party that provides generative response engine 140) but front end 102 is used to interface with generative response engine 140 rather than aid in developing a response to a prompt.

Some components of generative response engine 140 might be executed by computing programming units (CPU), and some components might be executed by graphical processing units (e.g., AI model(s) 110).

In some embodiments, client application 138 might provide a graphical user interface that is custom to client application 138 or can display graphical user interface 104 provided by generative response engine 140 provider.

Graphical user interface 104 is the platform through which users interact with the generative response engine 140. It can be a web-based chat window, an application, or any interface that supports data input and output. Graphical user interface 104 facilitates a conversation between the user and AI model(s) 110, as the user provides prompts in graphical user interface 104 to which AI model(s) 110 respond, and generative response engine 140 presents those responses in graphical user interface 104. In some aspects, graphical user interface 104 presents a conversational interface, which has attributes of a conversation thread between a user account and AI model(s) 110.

Graphical user interface 104 is configured to perform input handling and output presentation. The type of inputs that can be received can be relative to the specifics of generative response engine 140 and/or AI model(s) 110. For example, a language model is generally configured to accept text, but when the AI model is a multi-modal AI model, front end 102 can accept voice and images/video.

In some aspects, front end 102 can be a layer to accept any inputs, provide the inputs to generative response engine 140, receive outputs from generative response engine 140 and display the outputs. Graphical user interface 104 can accept any input types as part of the prompt, and a front end AI service 142 can determine which AI model or collection of AI models are best suited to respond to the prompt. The front end AI service 142 can be one or more AI models that can be trained to determine which AI model should be used to respond to a prompt, and in some examples, can be used to improve prompts or provide additional configuration details, such as how long a reasoning model should spend processing a prompt. In general, the front end AI service 142 can support functions of graphical user interface 104 by performing interference operations before a prompt is sent to generative response engine 140. Generally, the graphical user interface 104 is present on a client device, while the front end AI service 142 might be present on the same client device or on a server in a data center.

Graphical user interface 104 is also configured to maintain the context of the conversation, which allows for coherent and relevant responses. For example, graphical user interface 104 is responsible for providing the conversation thread and other relevant context accessible to the front end 102 to the AI models along with the specific prompt. In an example, a conversation between the user account and the AI model(s) 110 can have taken several turns (prompt, response, prompt, response, etc.). When the user account provides a further prompt, the graphical user interface 104 can provide that prompt to AI model(s) 110 in the context of the entire conversation.

In another example, graphical user interface 104 might be configured to provide a system prompt along with a user-provided prompt. A system prompt is hidden from the user account and is used to set the behavior and guidelines for the AI model. The system prompt can be used to define the AI's persona, style, and constraints. There can be levels of system prompts. A highest level of a system prompt might be provided by the AI model(s) 110 provider and is meant to establish policies for the behavior of AI model(s) 110. This highest level of system prompt should be prohibited from being edited. A customization system prompt can be used to customize the behavior of the AI model and is often provided through an API call, or provided by a user account when creating a customized version of AI model(s) 110. A still lower level of system prompt might include hidden information about a task. This can include chain-of-thought from a reasoning model, or context about an application that AI model(s) 110 is working with to complete a task. Accordingly, graphical user interface 104 does not display all of the output of the AI model.

Graphical user interface 104 is also configured to display the responses from the AI model, which might include text, code snippets, images, or interactive elements.

In some aspects, AI model(s) 110 can provide instructions to front end 102 that instruct graphical user interface 104 about how to display some of the output from the AI model. For example, the AI model and/or generative response engine can direct graphical user interface 104 to present code in a code-specific format, or to present interactive graphics, or static images. In other examples, the AI model and/or generative response engine can direct graphical user interface 104 to present an interactive document editor where graphical user interface 104 can be presented with the document editor so that the user account and the AI model can collaborate on the document.

In some aspects, AI model(s) 110 can provide instructions to personalization state 126 to record facts in a personalization notepad. Personalization state 126 can store information received directly from the user account or inferred from prompts provided by the user account, and can be used to provide context to the AI model such that output is personalized for the user account. In some examples, front end 102 can be configured to notify the user account that a memory was created. Personalization state 126 can also include summaries of past conversation threads between the user account and the generative response engine 140, and/or a searchable index of past conversation threads. In this way, personalization state 126 aid generative response engine 140 and/or AI model(s) 110 to learn specific facts about a user account and recall past interactions. The past interactions can be used to guide future responses by generative response engine 140 and/or AI model(s) 110 such that generative response engine 140 and/or AI model(s) 110 becomes personalized to a particular user account.

Generative response engine 140 can provide one or more application programming interfaces (API(s)) 106. APIs enable developers to integrate the AI model's capabilities into external applications and services. APIs 106 provide programmatic access to generative response engine 140, allowing for customized interactions and functionalities. While APIs 106 are shown as part of generative response engine 140, in some examples, APIs 106 are part of front end 102. API 106 can refer to points of access to AI model(s) 110. In some examples, API 106 endpoints are located at context management service 120.

APIs 106 can accept structured requests containing prompts, context, and configuration parameters. For example, an API can be used to provide prompts and divide the prompt into system prompts and user prompts. In some aspects, APIs 106 can provide specific inputs for which AI model(s) 110 are configured to respond with a specific behavior. For example, an API can be used to specify an output in a particular format or structured output. For example, in the chat completion API, the API call can specify parameters for the output, such as the max length for the desired output, and specify aspects of the tone of the language used in the response. The output can also be structured output and in a data interchange format such as JavaScript object notation (JSON). For example, the input query may include a schema that identifies a specific output structure. Some common APIs are for participating in a conversation (Chat Completion API), for providing a single response (Completion API), for converting text into embeddings (Embeddings API), etc. The API can also be used to indicate specific decision boundaries that AI model(s) 110 might be trained to interpret. For example, the moderation API can take advantage of AI assistant service 100's content moderation decision-making. In the case of the moderation API and others, the API might give access to services other than the AI model. For example, the moderation API might be an interface to moderation system 136, addressed below.

Some other common APIs include the Fine-Tuning API, which allows developers to customize AI model(s) 110 of generative response engine 140 using their own datasets; the Audio and Speech APIs, which cause AI model(s) 110 to output speech or audio; and the Image Generation API, which causes AI model(s) 110 to output images (which may request operations of other models).

There can also be APIs that direct AI model(s) 110 and/or generative response engine 140 to interface with other applications or other generative AI engines. In such cases, the specific application or AI engine might be specified, or AI model(s) 110 might be allowed to choose another application of generative response engine 140 to use in response to a prompt.

As described herein, a Responses API can be an improved API for interacting with AI model(s) 110. Responses API can take as a parameter a response ID, which can be used to return AI model(s) 110 to a state that the model was in at a particular response, thereby allowing a user account or developer to recall a previous context without having to re-prompt AI model(s) 110 or having to replicate a previous series of prompts. Further, Responses API can facilitate function/tool chaining to enable execution of operations requiring several function/tool calls without the added overhead of responding to an API caller to call the function or tool. Instead, deterministic code associated with the API can be directed to call functions or tools (including other AI models) on behalf of the AI model, and return data resulting from the function or tool call to the AI model.

In short, graphical user interface 104 and APIs 106 can be used to provide prompts to AI model(s) 110 of generative response engine 140. Prompts are sometimes differentiated into prompt types. For example, a system prompt can be a hidden prompt that sets the behavior and guidelines for the generative response engine. A user prompt is the explicit input provided by the user, which may include questions, commands, or information.

Generative response engine 140 may also include a context management service 120. The function of context management service 120 is to manage and organize the flow of data among key subsystems, enabling AI model(s) 110 to generate responses that are contextually relevant, accurate, and enriched with additional information as required.

Action 122 facilitates auxiliary tasks that extend beyond basic text generation. In some aspects, action 122 can be actions that correspond to an API 106. In some aspects, action 122 can be agentic actions that AI model(s) 110 decide to take to carry out a user's intent as described in the prompt. For example, an action can be to call tool 130 or even other AI model(s) 110. Tools 130 can include internet browsers, editors such as code editors, terminal, productivity suite, an independent application, other AI tools, etc. The tool 130 may be an application or a service that the generative response engine 140 may control to complete an agentic task. While tools are shown outside of generative response engine 140, some tools might be part of generative response engine 140 and some tools might be external tools.

Prompt 124 is the request or command provided by the user account through front end 102. In some aspects, prompt 124 can be further supplemented by a system prompt and other information that might be included by graphical user interface 104 or API 106 or associated with a custom AI model. In some aspects, prompt 124 can be modified or enhanced by AI model(s) 110 as addressed further below. Additionally, as the user account provides prompts and AI model(s) 110 provide responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by AI model(s) 110 can include a thread of user-provided messages and responses from AI model(s) 110 in a multi-turn conversation. The actors in the conversation thread can be labeled so that AI model(s) 110 can review the turns of the conversation. Generally, prompt 124 will include an entire conversation thread, but in some instances, prompt 124 may be shortened if it exceeds a maximum accepted length (generally measured by a number of tokens).

In some examples, context management service 120 can also route prompts and response through moderation system 136. In some aspects, prompts are provided to prompt safety system 132 before being provided to AI model(s) 110. Prompt safety system 132 is configured to use one or more techniques to evaluate prompts to ensure a prompt is not requesting AI model(s) 110 to generate moderated content. In some aspects, prompt safety system 132 can utilize text pattern matching, classifiers, and/or other AI techniques.

Since prompts can evolve over time through the course of a conversation, consisting of prompts and responses, prompts can be repeatedly evaluated at each turn in the conversation.

Personalization state 126 can facilitate continuity and personalization in conversations. It allows the system to maintain user-specific context, preferences, or details that may inform future interactions. Personalization state 126 can include a memory file of persisted data from previous interactions or sessions that provide background information to maintain continuity. In some aspects, information can be recorded to personalization state 126 at the instruction of AI model(s) 110 when AI model(s) 110 identify a fact or data that it determines should be saved in memory because the fact and/or data might be useful in later conversations or sessions. In some aspects, personalization state 126 can also include synthesized concepts extracted from past conversation threads, and personalization state 126 can also encompass the ability of AI model(s) 110 to search through past interactions to find relevant information to a current conversation thread.

Conversation metadata 128 can aggregate data points relevant to the conversation, including a prompt 124, action 122, and personalization state 126. This consolidated information package serves as the input for AI model(s) 110.

Conversation metadata 128 can label parts of a prompt as user-provided, AI model-provided, a system prompt, personalization state 126, data from action 122 or tool 130 (addressed below).

AI model(s) 110 are the core engines that process inputs (from context management service 120) and generate outputs. In some aspects, AI model(s) 110 may be a generative transformer, or autoregressive transformer, but could use other architectures. In some examples, the transformer is multi-modal transformer that can use audio tokens (or embeddings thereof), visual tokens (or embeddings thereof), and language (or embeddings thereof) as needed.

A core feature of AI model(s) 110 is to generate content in response to prompts. The prompt can be from client application 138 provided via graphical user interface 104. AI model(s) 110 can be configured to receive inputs via APIs 106 that provide guidance on a desired output. AI model(s) 110 can analyze the input and identify relevant patterns and associations in the data, and generate a sequence of tokens that are predicted as the most likely continuation of the input. AI model(s) 110 generate responses by sampling from the probability distribution of possible tokens, guided by the patterns observed during its training. Two features of the autoregressive transformer that result in this functionality are that the autoregressive transformer might use the decoder part of the transformer architecture and that it utilizes self-attention. By using the decoder part of the transformer architecture, the transformer focuses on predicting the tokens given the previous context tokens. And the self-attention mechanism captures long-range dependencies amongst tokens, allowing it to generate contextually relevant responses (in text, audio, images, and video).

In some aspects, AI model(s) 110 can generate multiple possible responses before presenting the final one. AI model(s) 110 can generate multiple responses based on the input, and these responses are variations that AI model(s) 110 consider potentially relevant and coherent.

In some aspects, AI model(s) 110 can evaluate generated responses based on certain criteria. These criteria can include relevance to the prompt, coherence, fluency, and sometimes adherence to specific guidelines or rules, depending on the application. Based on this evaluation, AI model(s) 110 can select the most appropriate response. This selection is typically the one that scores highest on the set criteria, balancing factors like relevance, informativeness, coherence, and content moderation instructions/training.

In some aspects, an instruction provided by an API 106, a system prompt, or a decision made by AI model(s) 110 can cause AI model(s) 110 to interpret a prompt and re-write it or improve the prompt for a desired purpose. For example, AI model(s) 110 can determine to take a prompt to make a picture and enhance the prompt to yield a better picture. In these instances, AI model(s) 110 can generate their own prompts, which can be provided to tool 130 or provided to AI model(s) 110 to yield a better output response than the original prompt might have.

AI model(s) 110 can also do more than generate content in response to a prompt. In some aspects, AI model(s) 110 can use decision boundaries to determine the appropriate course of action based on the prompt. In some examples, a decision boundary might be used to cause the AI model to recognize that it is being asked to provide a response in a particular format such that the AI model will generate its response constrained by the particular format. In some examples, a decision boundary can cause the model to refuse to generate a responsive output if the decision is that the responsive output would violate a moderation policy. In some examples, the decision boundary might cause the AI model to recognize that it interfaces with another AI model or application to respond to the prompt. For example, when the AI model is a language model, it might recognize that it is being asked to output an image, and therefore, it needs to interface with a model that can output images to provide a response to the prompt. In another example, the prompt might request a search of the Internet before responding. The AI model can use a decision boundary to recognize that it should conduct a search of the Internet and use the results of that search in responding to the prompt. In another example, the prompt might request that the AI model take an agentic action on behalf of the user by interacting with a third-party service (e.g., book a reservation for me at . . . ), and the AI model can use a decision boundary to recognize that it needs to plan steps to locate the third-party service, contact the third-party service, and interact with the third-party service to complete the task and then report back to the user that the action has been completed.

When AI model(s) 110 determine to take an agentic action on behalf of the user or to call a tool to aid in providing a quality response to the user account, AI model(s) 110 might call a tool 130 or cause an action 122 to be performed. As indicated above, tools 130 can include internet browsers, editors such as code editors, other AI tools etc. Actions 122 are actions that AI model(s) 110 can cause to be performed, perhaps using tool 130. As used herein actions 122 should be considered to cover a broad array of actions that AI model(s) 110 can perform with or without tools 130. Tools 130 are considered to cover a wide variety of services and software that encompass tools such as a computer operating system such that AI model(s) 110 can control the computer operating system on the user's behalf, to robotic actuators, to search browsers and specific applications.

Additionally, AI model(s) 110 can also generate portions of responses that are not displayed to the user. For example, AI model(s) 110 can direct front end 102 to provide specific behaviors, such as directions for how to present the response from AI model(s) 110 to the user account. In another example, AI model(s) 110 can provide response portions dictated by APIs 106, where portions of the response to the API might be for the consumption of the calling application but not for presentation to the end user. In another example, some AI model(s) 110 are reasoning models, which are AI model(s) 110 that are configured to output a raw chain-of-thought before preparing a final response to a prompt. The raw chain-of-thought might not be presented to a user account or application calling an API. Instead, another AI model might summarize the raw chain-of-thought into a more consumable and useful output for the user account or application.

In some aspects, the output of the AI model can be further analyzed by output safety system 134. While AI model(s) 110 can perform some of their own moderation, there can be instances where it is beneficial to have another service review outputs for compliance with a moderation policy. The use of dashed lines in FIG. 1 differentiates a path using output safety system 134 and not using output safety system 134.

As used herein, the present description may refer to the generative response engine or AI model(s) making a determination or reasoning prior to providing a response to a prompt. Determining can refer to a process by which an AI model outputs a response that provides a conclusion. In an example, an AI model can perform an inference operation to output a sequence of tokens, which output provides a determination. In such an example, the AI model might not have made any decision other than to sample particular tokens to provide an output, yet the response from the AI model might be a statement of determination. In another example, AI models can be trained to make particular determinations. In such examples, the AI model can be trained to make a decision, such as to cross a decision boundary to take an agentic action or to call a tool, etc.

Reasoning refers to simulating logical processes to draw conclusions or perform tasks based on provided inputs and learned information. Although the AI model might lack true understanding, they use pattern recognition and linguistic associations to emulate reasoning by linking related concepts and predicting outcomes. As used herein, the term reasoning by an AI model refers to the process performed by AI models known as reasoning models.

Figure 2:
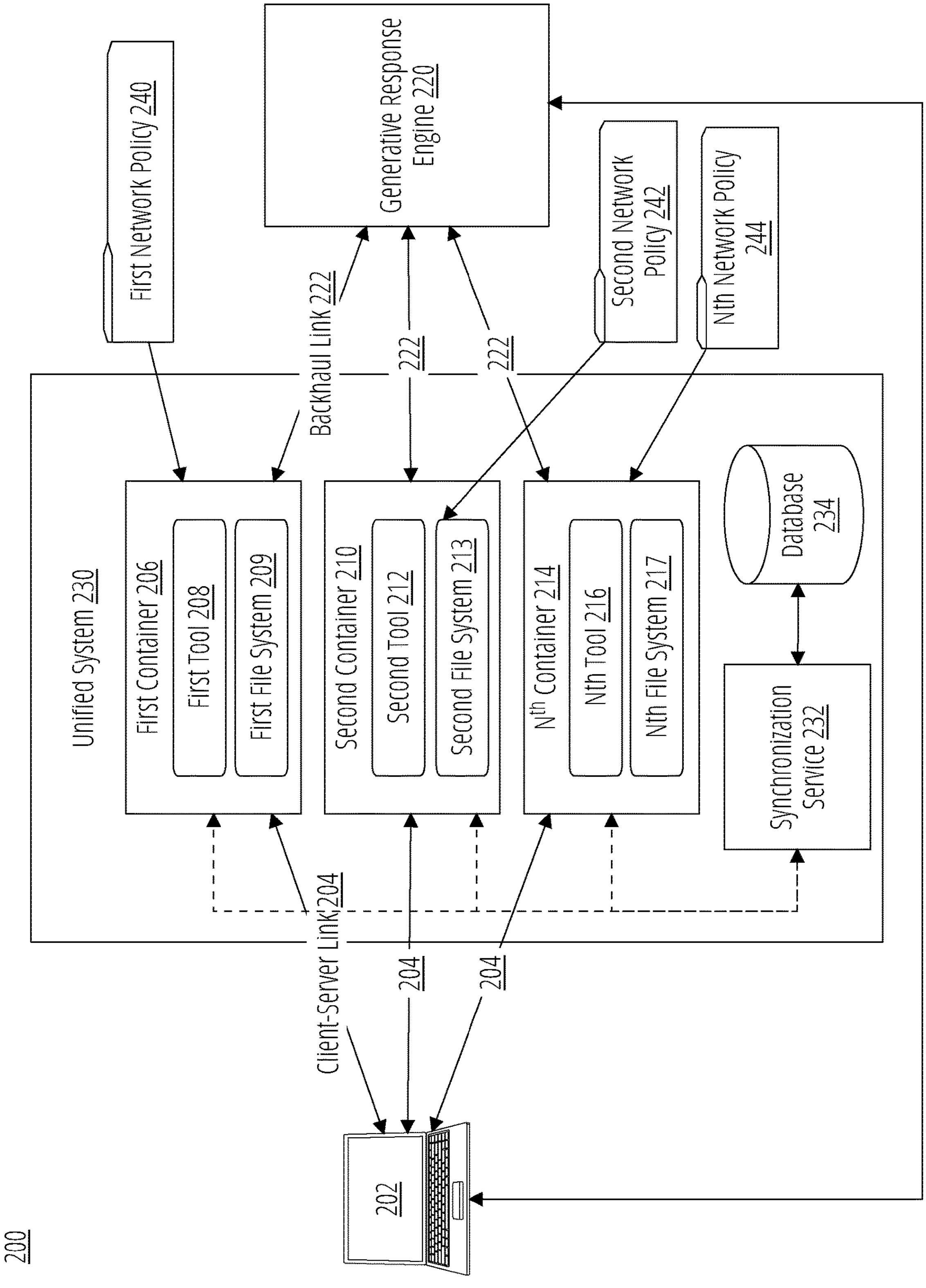
FIG. 2 is a diagram illustrating a system in which a client device interacts with a cloud-based generative response engine to perform multi-step agentic tasks through tool invocations in accordance with some aspects of the disclosure.

FIG. 2 is a diagram illustrating a system 200 in which a client device interacts with a cloud-based generative response engine to perform multi-step agentic tasks through tool invocations in accordance with some aspects of the disclosure. The components of the system 200 depicted in FIG. 2, and the arrangement thereof, are provided for explanatory purposes. Additional components may be included, fewer components may be used, and the illustrated arrangement of the system 200 may be modified without departing from the scope of the present disclosure.

The system 200 includes a client device 202 (e.g., a user's workstation running a graphical user interface 104 of FIG. 1) that interacts with a generative response engine 220 (for example, generative response engine 140) to perform an agentic task. Communication between the client device 202 and the generative response engine 220 traverses a secure client-server link 204, which may be implemented over HTTPS or a similar encrypted protocol.

In this embodiment, the client device 202 hosts a GUI such as the graphical user interface 104 that renders the initial user prompt and displays interactive progress windows as the user's commands are executed by one or more tools. In the cloud, the generative response engine 220 orchestrates a first container 206 hosting a first tool 208 (e.g., a browser), a second container 210 hosting a second tool 212 (e.g., a terminal or productivity application), and a Nth container 214 hosting a Nth tool 216 (e.g., a suite of office applications). Each container has its own virtual environment and file system, but the containers share a synchronized directory via a synchronization service 232 and database 234. Containers, the synchronization service 232, and the database 234 form a unified system 230. The unified system 230 ensures that state changes—such as downloaded files or document edits—are immediately visible to all active tools, while network policies restrict each container's access according to its intended function.

In some embodiments, upon receiving the prompt, the generative response engine 220 instantiates isolated execution environments—shown here as the first container 206 and the Nth container 214—each running in its own virtualized sandbox with an independent operating environment. The first container 206 is specially configured to execute the first tool 208, such as a web browser, while the second container 210 executes the second tool 212, for example a command-line terminal or a productivity application. As noted above, the system 200 is extensible and can have n number of containers and tools as illustrated by the Nth container 214 executing Nth tool 216.

The containers include a virtual file system: a first file system 209 on the first container 206, a second file system 213 on the second container 210, and a Nth file system 217 on the Nth container 214. Within the file systems reside a shared, dedicated directory accessible at a predefined path from the root (for example, "/usr/local/agentic/shared"). The dedicated directory serves as the synchronization point for all stateful artifacts—such as downloaded files, log outputs, edited documents, cookies, session keys, and other application state data—generated by any tool during the agentic task. In some embodiments, the generative response engine 220 is configured to save and access content items relevant to the agentic task using the shared, dedicated directory accessible at a path from the root.

The unified system 230 includes a synchronization service 232 and a database 234. The synchronization service 232 monitors filesystem events within the dedicated directory on the containers, propagating file creation, modification, and deletion events in real time. These events are stored in the database 234, which maintains a canonical, versioned record of the shared directory's state. As a result, state changes effected by one tool—for example, the browser downloading a data set or a terminal writing log files—are immediately visible to all other active tools without manual intervention. As such, the generative response engine 220 is configured to save and access content items relevant to the agentic task using the synchronization service 232 and database 234.

Network isolation is enforced through distinct network policies attached to respective containers. The first container 206 is subject to a first network policy 240 that may, for instance, permit only HTTP/HTTPS traffic to a whitelisted set of URLs. The second container 210 might be bound by a separate, more restricted network policy such as a second network policy 242 that prohibits external Internet access or limits connectivity to internal APIs. The Nth container 214 might be bound by yet another network policy such as an nth network policy 244 in which no Internet access is permitted and only an internal file system is to be retrieved e.g., the Nth file system 217. These policies prevent tools from accessing unauthorized resources and ensure that tools can only communicate with endpoints appropriate to their intended function. In some embodiments, the policies may include other security policies and/or enterprise policies such as but not limited to authentication credentials, multi-factor authentication, user access level, etc.

At the client device 202, screenshots or streaming video of the tools—represented as the first tool 208, the second tool 212, and the Nth tool 216—are rendered within the graphical user interface 104 of FIG. 1 on the client device 202.

A backhaul link 222 carries all traffic between the generative response engine 220 and the unified system 230, ensuring low-latency synchronization across container instances. Collectively, these components form an agentic system that maintains strong isolation, real-time state synchronization, and fine-grained network controls, enabling secure, coordinated tool execution in support of complex, multi-step user tasks.

In some embodiments, an application layer mediates interactions between the generative response engine 220 and a plurality of tool-executing containers by exposing to the generative response engine 220 only a single session identifier (ID) that represents an ongoing agentic task. Internally, the application layer maintains a mapping from tool descriptors (e.g., "browser," "terminal," or a named productivity application) to container identifiers for corresponding container instances, together with associated network and security policies. Upon receiving a tool call that references the session identifier (ID), the application layer routes the call to the appropriate container by resolving the mapping and, if necessary, instantiating or selecting a container instance that satisfies the policy and capability requirements of the call.

In some embodiments, the desktop-like user interface renders streamed imagery from whichever container is currently active as one or more windows within a single windowed environment. The user may be presented with tool names and task context only, and neither the user nor the generative response engine is exposed to any container identifier.

In some embodiments, for state continuity across tools, each container mounts a dedicated directory at a predefined path from a root of that container's file system. The synchronization service 232 maintains the dedicated directory in a synchronized state across the plurality of containers. On selection or changeover from the first tool 208 to the second tool 212, the application layer verifies that the dedicated directory is mounted in the target container at the predefined path from the root and is synchronized before the second tool executes, such that artifacts produced by the first tool 208 (e.g., intermediate files, cached data, or browser storage synchronized according to policy) are immediately accessible to the second tool 212 without additional handoff logic. The desktop-like user interface preserves the appearance of a single computer—for example, by keeping window positions, task affordances, and screenshot citations consistent across changeovers—while the underlying container selection and directory mounting occur transparently, without surfacing any container identifiers to the generative response engine 220 or the user.

Figure 3:
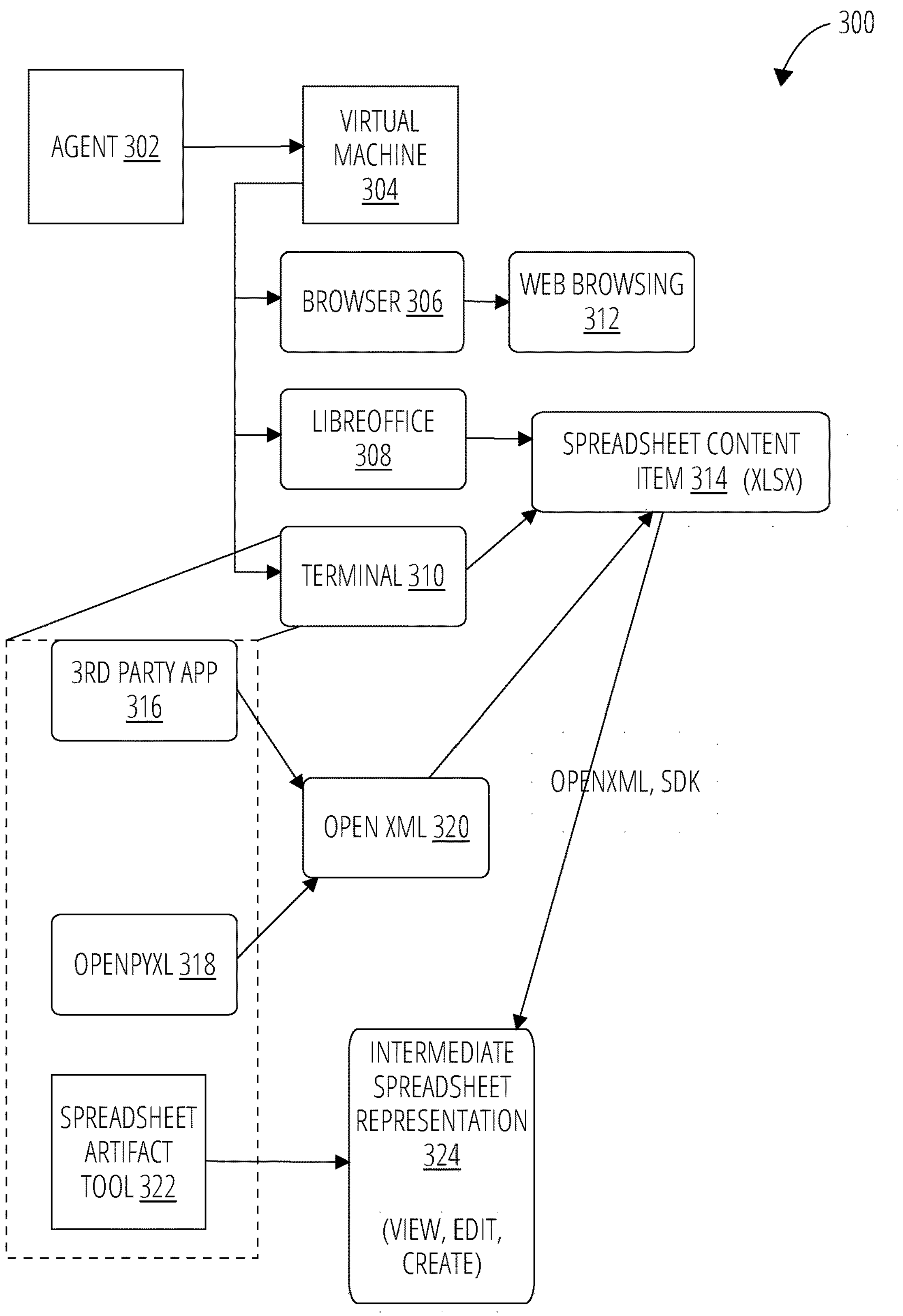
FIG. 3 is a diagram illustrating a system enabling an agent and a user to author spreadsheet artifacts using spreadsheet tools and an intermediate spreadsheet representation in accordance with some aspects of the disclosure.

With continued reference to FIG. 2, FIG. 3 is a diagram illustrating a system 300 enabling an agent and a user to author spreadsheet artifacts using spreadsheet tools and an intermediate spreadsheet representation in accordance with some aspects of the disclosure. The components of the system 300 depicted in FIG. 3, and the arrangement thereof, are provided for explanatory purposes. Additional components may be included, fewer components may be used, and the illustrated arrangement of the system 300 may be modified without departing from the scope of the present disclosure.

The system 300 includes an agent 302, a virtual machine 304, a browser 306 for web browsing 312, a LibreOffice 308 and a terminal 310 for viewing a spreadsheet content item 314 such as a spreadsheet (xlsx). That is, the terminal 310 may run 3rd party app 316 such as a Python library for manipulating spreadsheet files (openpyxl 318). The 3rd party app 316 such as openpyxl 318 generate the spreadsheet content item 314 in an open XML format (an Open XML 320). The terminal 310 may further run a spreadsheet artifact tool 322 that generates an intermediate spreadsheet representation 324 for manipulations by user(s) and/or the agent 302.

The agent 302 may be an example of the generative response engine 220 of FIG. 2 or some other automated agent or AI model. For example, the agent 302 may be implemented using one or more LLMs configured to receive prompts from a user account and to perform agentic tasks on behalf of the user including but not limited to generating and manipulating spreadsheet content items. The agent 302 interacts with the virtual machine 304, which provides an isolated desktop-style computing environment, an example described with reference to FIG. 2. For example, the virtual machine 304 may execute an operating system, a graphical windowing system, and multiple applications that can be controlled programmatically by the agent 302. In some embodiments, the agent 302 issues commands to the virtual machine 304 via a remote desktop protocol or other automation interface.

In some embodiments, within the virtual machine 304, the browser 306 is executed. The browser 306 may be a web browser application controlled by the agent 302 to perform web browsing 312 activities such as navigating to websites, submitting forms, and retrieving web content. Also, the LibreOffice 308 may be executing in the virtual machine 304. The LibreOffice 308 represents an office productivity suite capable of opening and editing spreadsheet content items. Under the control of the agent 302, the LibreOffice 308 can be used to author the spreadsheet content item 314. Authoring spreadsheet content item 314 involves viewing, generating, and/or editing. The spreadsheet content item 314 represents a content item persisted in a first file type such as a spreadsheet file in an xlsx format.

In some embodiments, the terminal 310 may represent a command-line shell or terminal emulator running in the same virtual machine 304. The terminal 310 may be used by the agent 302 to execute operating-system commands, run scripts, or invoke command-line tools that manipulate files, including the spreadsheet content item 314 or intermediate files used to construct the spreadsheet content item 314.

A third-party application 316 may be part of or outside the VM execution stack. For example, the 3rd party app 316 may represent external services, libraries, or code (e.g., server-side tooling) that can generate or manipulate spreadsheet artifacts without driving a full desktop application. For example, third-party application 316 may operate a library such as openpyxl 318, which is illustrative of a Python library used to programmatically generate or modify Excel spreadsheet files. The openpyxl 318, as well as LibreOffice 308 and potentially the terminal 310, may output or manipulate files in an Open XML 320 format, which underlies xlsx artifacts. Thus, the Open XML 320 represents an Open XML object model or document tree produced by one or more of the LibreOffice 308, the terminal 310, the third-party application 316 such as the openpyxl 318. The spreadsheet content item 314 may be generated in a first file type such as an Open XML-based file format (xlsx) and is conceptually linked to the Open XML 320, which represents the structured markup underlying the user-visible artifact. In some embodiments, an Open XML software development kit (SDK) is used to parse, validate, and emit the Open XML 320 from or into the spreadsheet content item 314. As shown, multiple sources may generate Open XML content that ultimately contributes to the system's artifact pipeline.

However, as noted above, it is difficult to manipulate and edit the spreadsheet content item 314. As such, the system 300 includes the spreadsheet artifact tool 322. In some embodiments, the spreadsheet artifact tool 322 is a programming interface or a library that exposes a plurality of high-level programmatic operations for manipulating the intermediate spreadsheet representation 324. In various embodiments, the spreadsheet artifact tool 322 may be implemented in Python or another language and provides high-level function calls such as "set cell formula" or "insert chart." These high-intent function calls are invocable by the agent 302 and also by a user interface (e.g., a web-based editor), such that both the AI model and a human user interact with the same intermediate spreadsheet representation 324 through the same spreadsheet artifact tool 322. The spreadsheet artifact tool 322 encapsulates the logic for creating and updating the data objects in intermediate spreadsheet representation 324, relieving the agent 302 from the need to construct or modify Open XML 320 directly.

The intermediate spreadsheet representation 324 is a machine-first, unified artifact representation that is native to the agent 302 such as the generative response engine 220 of FIG. 2. In some embodiments, the intermediate spreadsheet representation 324 is realized as a hierarchical scene-tree encoded in JavaScript Object Notation (JSON). Each node in this scene-tree corresponds to a respective object of the content item (e.g., chart, table, or cell range) and includes type and attribute data sufficient to represent spreadsheet content items encoded in Open XML-based file type for the spreadsheet format (e.g., xlsx). For example, the hierarchical scene-tree of nodes defines objects corresponding to charts, cells, and/or layout regions of the spreadsheet content item. The intermediate spreadsheet representation 324 is designed to be directly manipulatable by programmatic operations that update nodes in the scene-tree and supports view, edit, and create operations on spreadsheet artifacts without requiring the agent 302 to operate on raw Open XML markup.

In some embodiments, the manipulations may involve programmatic operations that directly access, create, or modify the intermediate spreadsheet representation 324 that models spreadsheet content item 314 as a structured scene-tree (also referred to herein as an object graph or document object model). In some embodiments, the scene-tree includes nodes corresponding to spreadsheet constructs, including, for example: a workbook node; one or more worksheet nodes; cell nodes addressable by cell address; range nodes addressable by address ranges; and attribute nodes representing cell values, cell formulas, and cell formatting (e.g., number formats, fonts, fills, borders, alignment, row height, and column width), as well as higher-order spreadsheet features (e.g., conditional formatting rules, merged regions, comments/notes, named ranges, and charts).

In some embodiments, the intermediate spreadsheet representation 324 is designed to be directly manipulatable via the manipulations described herein, such that the agent 302 and/or a generative response engine 220 of FIG. 2 may perform view, edit, and generate operations on spreadsheet artifacts by operating on the scene-tree nodes and their attributes. In this manner, the agent 302 is not required to parse, generate, or modify raw Open XML markup associated with XLSX files (including XML parts packaged in a compressed container), and instead performs operations against the intermediate spreadsheet representation 324 through one or more programmatic interfaces (e.g., the spreadsheet artifact tool 322).

Some non-limiting examples of various manipulation operations may involve retrieving a listing of worksheets in a workbook and their identifiers/names, retrieving a worksheet node by worksheet name or identifier, reading a cell value, formula, and/or data type at a specified cell address, reading a rectangular cell range as raw stored data (e.g., values and/or formula strings), reading a rectangular cell range as evaluated values (e.g., post-calculation values), computing and returning a worksheet summary including at least one of: filled rows, filled columns, and a minimum/maximum filled range, computing and returning an effective-format summary for a cell, including at least one of: fill, font, border, alignment, or number format, writing or overwriting a single cell value at a specified cell address, writing a two-dimensional array of values to a specified rectangular range in a single operation, editing multiple adjacent cells in a row or column by applying a range write operation, setting a cell formula at a specified cell address, setting formulas over a specified range (e.g., populating a column of per-row formulas) in a single operation, rewriting a formula to correct a reference, range, or operator error while preserving intended semantics, applying a number format to a cell or range, including currency, percentage, date, or negative-number formatting, applying style attributes to a cell or range, including font attributes, fill attributes, border attributes, and alignment attributes, setting column widths for one or more columns and setting row heights for one or more rows, adjusting a worksheet-level property (e.g., a default row height) to improve readability, creating a new workbook artifact, a new worksheet node in the workbook, or a reusable cell format/style definition, and applying the reusable format/style to one or more cells or ranges, creating one or more helper/intermediate calculation cells to split a complex computation into multiple, more human-editable formulas, creating a comment/note object associated with a cell (e.g., for provenance/citation or explanatory annotations), creating a change-log worksheet and inserting one or more change entries describing modifications made by the agent, and translating an XLSX spreadsheet into or from the intermediate spreadsheet representation 324 to enable scene-tree manipulations without editing Open XML parts.

In some embodiments, the foregoing manipulations are exposed as "high-intent" operations that correspond to semantically meaningful spreadsheet edits (e.g., "set values in a range," "set formulas in a column," "apply a header style," "recalculate formulas," "render a sheet"), thereby enabling efficient agent control of spreadsheet artifacts and reducing error-prone interactions with low-level file-format markup. For example, the high-intent function calls may include setting a formula in a cell or a range of cells, or triggering re-computation of values for a plurality of dependent cells based on the formula, or generating a chart based on a specified range of cells. As such, updating the spreadsheet content item includes updating a dependency graph for the spreadsheet and regenerating chart data in the file type that is native to the generative response engine.

That is, the Open XML 320 is translated into the intermediate spreadsheet representation 324 and back, for example using an OpenXML SDK and a predefined, strongly typed mapping between Open XML elements and corresponding objects in the intermediate spreadsheet representation 324. This mapping is configured so that each syntactically valid instance of the intermediate spreadsheet representation 324 deterministically corresponds to a unique Open XML instance that can be saved as the spreadsheet content item 314 and opened without repair warnings in applications made to edit spreadsheet files.

In contrast to related art, which relies on third-party Open XML generators to produce spreadsheet artifacts, often with errors and warnings. The system 300 includes the spreadsheet artifact tool 322 that generates the intermediate spreadsheet representation 324. The spreadsheet artifact tool 322 is a shared, high-level editing layer that both the agent 302 and user-facing components use to manipulate the intermediate spreadsheet representation 324 via intent-level programmatic operations. The intermediate spreadsheet representation 324 is a unified, AI-native JSON scene-tree representation used for viewing, editing, and creating artifacts across multiple Open XML file types such as spreadsheets. The components of the system 300 enable robust, deterministic translation between Open XML artifacts and an AI-friendly representation.

Additionally, the agent 302 (or a generative response engine) may be trained using a teacher model. The teacher generative model generates a tool-using trajectory responsive to an augmented prompt that includes the prompt and an instruction to access and follow a set of spreadsheet constraints. The tool-using trajectory includes one or more calls to the spreadsheet artifact tool 322 that is configured to create or modify the intermediate spreadsheet representation 324. The set of spreadsheet constraints defines spreadsheet-format-specific constraints for creating or modifying spreadsheets including at least one of: a formula constraint, a formatting constraint, a citation constraint, or a verification constraint. The tool-using trajectory is analyzed to compute a score indicative of a compliance with the set of spreadsheet constraints. Analyzing the tool-using trajectory includes using at least one automated grader to compute the score, determine whether the intermediate spreadsheet representation 324 of the content item generated by the spreadsheet artifact tool 322 satisfies at least a portion of the set of spreadsheet constraints and selecting, based on the score, one or more graded trajectories to form a training data set for the agent 302. The agent 302 is then trained using one or more examples in which the one or more graded trajectories are transformed to remove at least a portion of the instruction to access and follow the set of spreadsheet constraints while retaining at least the prompt and an association between the prompt and one or more tool-using actions that create or modify the content item. Thus, parameters of the agent 302 are updated using the training example such that, after training, the generative response engine, when provided the prompt without the instruction to access and follow the set of spreadsheet constraints, is more likely to generate the tool-using trajectory that complies with the set of spreadsheet constraints.

Figure 4:
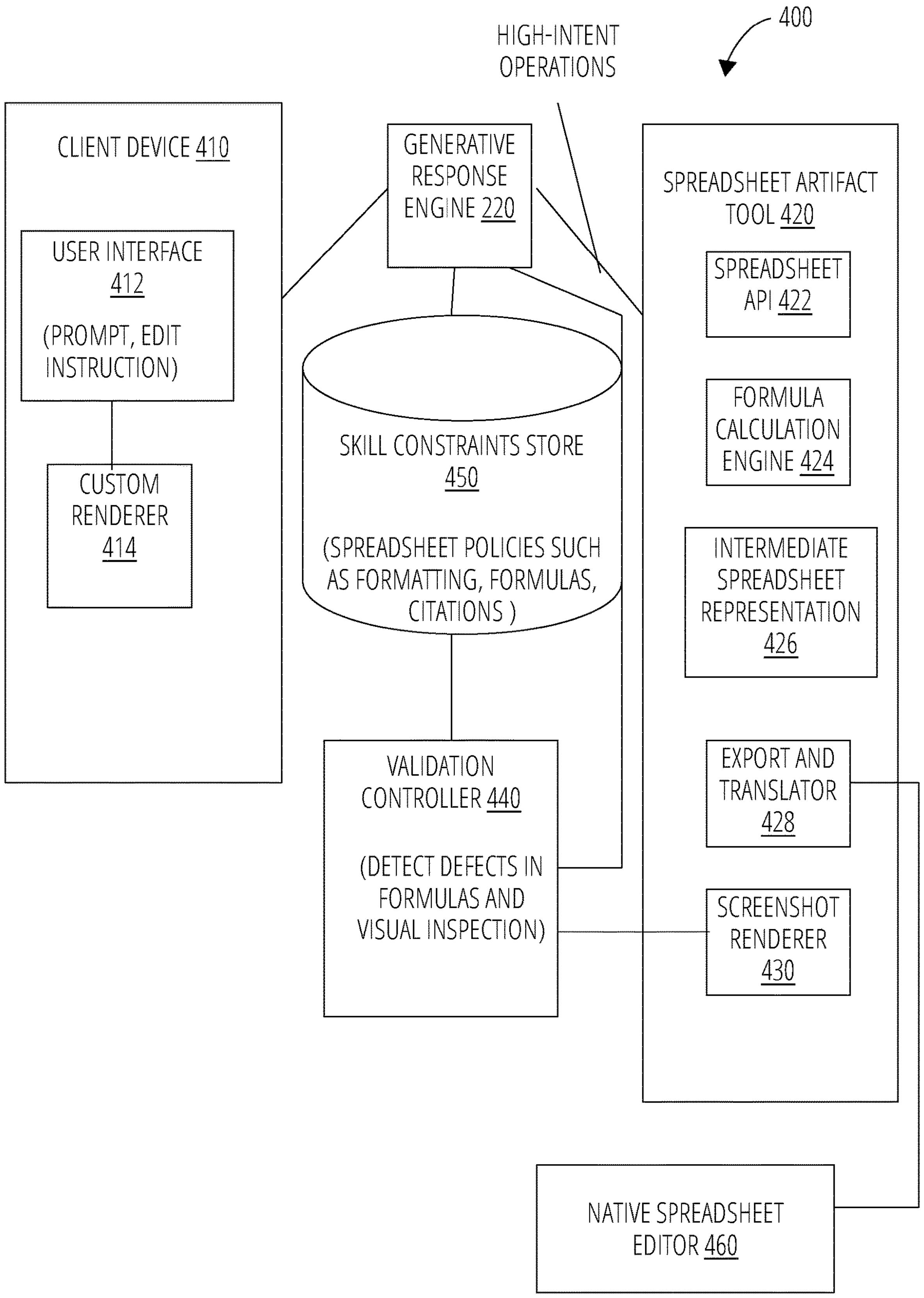
FIG. 4 is a diagram illustrating an example system enabling an agent and a user to compose and validate spreadsheet artifacts using spreadsheet tools and a validation controller in accordance with some aspects of the disclosure.

FIG. 4 is a diagram illustrating an example system 400 enabling an agent and a user to compose and validate spreadsheet artifacts using spreadsheet tools and a validation controller in accordance with some aspects of the disclosure.

The components of the example system 400 depicted in FIG. 4, and the arrangement thereof, are provided for explanatory purposes. Additional components may be included, fewer components may be used, and the illustrated arrangement of the example system 400 may be modified without departing from the scope of the present disclosure.

The example system 400 includes a client device 410 that communicates with the generative response engine 220 of FIG. 2 (or the agent 302 of FIG. 3) that performs an agentic task defined by a user prompt to compose a spreadsheet content item e.g., create and/or modify, using a spreadsheet artifact tool 420. The example system 400 is configured to enable programmatic spreadsheet editing using high-intent spreadsheet operations, and further includes the validation controller 440 configured to validate correctness through formula recalculation and (optionally) visual validation prior to exporting an output spreadsheet file for use in a native spreadsheet editor 460. The generative response engine 220 generates the spreadsheet content item based on spreadsheet policies stored in the skill constraints store 450. The generative response engine 220 is trained to follow the spreadsheet constraints using strong prompting.

In some embodiments, the example system 400 represents spreadsheet artifacts in intermediate spreadsheet representation 426 that is directly manipulable by programmatic operations rather than requiring direct manipulation of raw Open XML markup in an XLSX container. The example system 400 exposes model-optimized high-intent operations that correspond to semantic spreadsheet editing actions and integrates verification primitives such as formula recalculation and render-to-image visual inspection into an iterative correction loop guided by stored spreadsheet-specific constraints stored in the skill constraints store 450.

In some embodiments, the client device 410 may be any suitable computing device, such as a desktop computer, laptop computer, tablet computer, or mobile device. The client device 410 includes user interface 412 and the custom renderer 414.

The user interface 412 configured to receive a prompt and/or edit instruction that defines an agentic task to compose a spreadsheet content item. For example, user interface 412 may receive a natural-language request to create a multi-worksheet workbook, populate tables, insert formulas for derived values, and apply formatting conventions and citations. The user interface 412 may further be configured to present outputs generated by the generative response engine 220, such as a downloadable spreadsheet file, a preview of one or more worksheets, a change summary, and/or intermediate progress updates.

The custom renderer 414 is configured to present a spreadsheet artifact without requiring the user to open the native spreadsheet editor 460. For example, the custom renderer 414 may display intermediate spreadsheet representation 426 of the spreadsheet content item (e.g., a structured workbook view) and/or may display one or more rendered images of the spreadsheet content item generated by the screenshot renderer 430. In some embodiments, the custom renderer 414 additionally displays a human-readable change description derived from an ordered log of high-intent operations performed by the generative response engine 220.

The generative response engine 220 interprets prompts received from the user interface 412 and performs agentic tasks on behalf of a user. In some embodiments, the generative response engine 220 includes an AI model (e.g., a large language model) that generates structured tool calls, including calls to the spreadsheet artifact tool 420, to create and/or modify the spreadsheet content item. The generative response engine 220 performs the agentic task by invoking one or more high-intent operations provided to the spreadsheet artifact tool 420.

High-intent operations specify semantic spreadsheet editing operations that correspond to human user editing actions (e.g., setting values in a range, setting formulas in a column, merging a range, applying a header style, setting row heights or column widths, creating conditional formatting, inserting cell comments for citations, and/or exporting a workbook). In some embodiments, the high-intent operations are function calls cause the spreadsheet artifact tool 420 to apply a corresponding transformation to a spreadsheet file and/or to intermediate spreadsheet representation 426 of a spreadsheet workbook. In some embodiments, generative response engine 220 iteratively repeats invocation of the high-intent operations until the agentic task is complete.

In some embodiments, the generative response engine 220 generates and maintains an ordered log of invoked high-intent operations. The ordered log may be converted into a human-readable change description that is rendered to the user via the user interface 412, indicating changes made to the spreadsheet content item by the generative response engine 220. In some embodiments, the ordered log is additionally used to support auditing, replay, deterministic regeneration, and/or conversion of tool calls into user-visible edit summaries.

The generative response engine 220 is trained to operate in accordance with spreadsheet-specific constraints stored in the skill constraints store 450. The skill constraints store 450 includes one or more data stores that store spreadsheet-specific constraints (also referred to as policies, guidelines, or a spreadsheet skill specification).

In some embodiments, the skill constraints store 450 stores constraints that define spreadsheet-format-specific requirements for creating or modifying spreadsheets, including at least one of: a formula constraint, a formatting constraint, a citation constraint, and a verification constraint. Non-limiting examples may include requiring derived values to be expressed using spreadsheet formulas rather than hardcoded values, requiring or restricting classes of spreadsheet functions, requiring human-editable formulas (e.g., simple and legible formulas with helper/intermediate calculation cells when appropriate), requiring suitable number formats (currency, percentage, date, negative-number formats), requiring embedded citations (e.g., cell comments or a citations column), and/or requiring verification behaviors such as recalculating formulas and/or rendering worksheets for inspection before completing the task.

In some embodiments, generative response engine 220 consults the skill constraints store 450 to plan the spreadsheet structure and to select high-intent operations that satisfy the stored constraints. In some embodiments, the validation controller 440 also consults skill constraints store 450 to determine whether recalculation results and/or visual characteristics satisfy one or more of the stored spreadsheet-specific constraints.

The spreadsheet artifact tool 420 is configured to compose or author spreadsheet artifacts e.g., create, edit, analyze, validate, render, and export. Spreadsheet artifact tool 420 includes a spreadsheet API 422, a formula calculation engine 424, an intermediate spreadsheet representation 426, an export and translator 428, and a screenshot renderer 430.

The spreadsheet API 422 exposes high-intent operations to generative response engine 220. In some embodiments, spreadsheet API 422 supports workbook/worksheet creation, cell and range addressing, setting values, setting formulas, applying formatting attributes, adjusting row heights and column widths, merging ranges, creating conditional formatting, inserting comments/notes, rendering worksheets to images, recalculating formulas, and exporting to an output spreadsheet file format. In other words, the spreadsheet API 422 obtains high-intent operations from the generative response engine 220, translates them into core spreadsheet primitives to generate or modify the intermediate spreadsheet representation 426.

In some embodiments, the formula calculation engine 424 is configured to analyze spreadsheet formulas and generate recalculation results. In some embodiments, the formula calculation engine 424 automatically recalculates formulas when edits are made (e.g., when a referenced input cell value changes or when a formula is modified). In some embodiments, spreadsheet API 422 provides an explicit recalculation operation that may be invoked after a subset of high-intent operations or after a batch of high-intent operations. In some embodiments, recalculation results include computed values for formula cells and/or error indicators for one or more formula evaluation failures. In some embodiments, recalculation results are associated with corresponding cells as cached results, enabling verification and downstream rendering/export to reflect computed values. As such, the generative response engine 220 may validate formula correctness programmatically and remediate defects prior to delivering the workbook, reducing the likelihood of delivering spreadsheets that contain formula errors.

The spreadsheet artifact tool 420 operates on the intermediate spreadsheet representation 426. Intermediate spreadsheet representation 426 is a unified, structured workbook representation comprising nodes representing sheets and a plurality of cells. Each cell is associated with a cell address and one or more cell attributes, including one or more of a cell value, a cell formula, and a cell format attribute (e.g., number format, fill, font, border, alignment). In some embodiments, intermediate spreadsheet representation 426 further includes nodes for ranges, merged regions, conditional formatting rules, and comments/notes. In some embodiments, intermediate spreadsheet representation 426 is designed to be directly manipulable by programmatic operations (e.g., high-intent operations) that update the nodes in the intermediate spreadsheet representation 426, thereby enabling spreadsheet view, edit, and create operations without requiring the generative response engine 220 to operate on raw Open XML markup associated with XLSX files.

By generating the intermediate spreadsheet representation 426 for the spreadsheet content item, the complexity and fragility associated with direct manipulation of compressed Open XML parts of XLSX files are reduced. Additionally, edits are represented as semantically meaningful operations (e.g., range operations and style operations) rather than as low-level markup differences, which in turn supports user-visible change descriptions, operation replay, and more robust conflict handling in collaborative editing scenarios.

The export and translator 428 is configured to translate intermediate spreadsheet representation 426 to an output spreadsheet file in a spreadsheet format type (e.g., XLSX). In some embodiments, the export and translator 428 also supports importing an existing spreadsheet file into intermediate spreadsheet representation 426 to support modification tasks e.g., from the native spreadsheet editor 460. In some embodiments, the export and translator 428 includes cached calculation results in the exported file so that the native spreadsheet editor 460 may display computed values without requiring the user to manually trigger recalculation.

The screenshot renderer 430 is configured to render at least a portion of a spreadsheet content item to one or more images. In some embodiments, screenshot renderer 430 generates images depicting a full worksheet e.g., a montage image (including visible cell borders, row and column layout, and formatted headers) and/or generates images depicting a modified portion of the worksheet e.g., raster images. In some embodiments, the generated images are provided to the generative response engine 220 for inspection, and/or transmitted to client device 410 for display by custom renderer 414. The screenshot renderer 430 enables visual verification of formatting and layout that may not be reliably validated by object inspection alone. For example, rendering can reveal truncation of labels due to insufficient column width, misalignment of numeric columns, inconsistent header styling across worksheets, or missing borders/titles that a user would expect in professional spreadsheets.

The validation controller 440 is configured to detect defects and validate correctness of the spreadsheet content item during and/or after composition. The validation controller 440 may be implemented as a separate module (as illustrated), or as a component of generative response engine 220, or as a component of spreadsheet artifact tool 420, or as a combination thereof.

In some embodiments, the validation controller 440 coordinates a verification process that includes recalculating spreadsheet formulas in the spreadsheet content item after one or more spreadsheet editing operations to produce recalculation results, detecting one or more formula errors based on the recalculation results, and responsively generating and applying additional spreadsheet editing operations to correct the detected errors. The validation controller 440 may refer to spreadsheet specific constraints in the skill constraints store 450 when determining presence of one or more defects.

In some embodiments, the formula errors include at least one of: a formula evaluation error, a reference error, a divide-by-zero error, and an inconsistent-range error. In response to detecting errors, the validation controller 440 may cause generative response engine 220 to generate corrective high-intent operations that modify at least one of: cell values, cell formulas, or cell formatting. For example, corrective operations may adjust an erroneous reference, correct a range boundary, insert guard logic to prevent divide-by-zero, or restructure formulas to resolve inconsistent-range defects. In some embodiments, validation controller 440 iteratively repeats recalculation and error detection after corrective edits until the spreadsheet content item is free of detected formula errors.

In some embodiments, the validation controller 440 additionally supports visual validation. For example, the validation controller 440 may cause screenshot renderer 430 to obtain one or more images depicting at least a modified portion of the spreadsheet content item, and generative response engine 220 may determine whether the depicted portion satisfies visual validation constraints (e.g., presence of a title region and borders delineating sections, consistent formatting across worksheets, visual distinction between input cells and derived cells, and number formats rendering as currency/percent/dates rather than unformatted numbers). When the depicted portion does not satisfy the visual validation constraints, the generative response engine 220 may generate and apply additional high-intent spreadsheet editing operations and repeat rendering and inspection until the visual constraints are satisfied.

The native spreadsheet editor 460 represents one or more third-party or operating-system-provided applications configured to open and edit spreadsheet files (e.g., XLSX). In some embodiments, the export and translator 428 generates an output spreadsheet file compatible with native spreadsheet editor 460. In some embodiments, the output spreadsheet file includes formulas, formatting, and cached calculated values such that the spreadsheet opens with correct computed results and professional formatting, thereby reducing user rework and increasing trust in agent-generated spreadsheet artifacts.

In many spreadsheet tasks, users provide only a high-level prompt while expecting compliance with implicit, hidden-context requirements, for example, when asked to build a discounted cash flow (DCF) model, the expected output is an XLSX workbook that uses spreadsheet formulas for derived values (not hardcoded numbers), applies professional formatting (e.g., currency/percent/date formats and readable layout), and includes source citations in the sheet. In some embodiments, the example system 400 increases reliability for these hidden-context requirements by combining spreadsheet-specific constraints stored in the skill constraints store 450 (including formula, formatting, citation, and verification constraints) and a corresponding training pipeline that conditions the generative response engine 220 to follow these constraints, with an automated recalculate-and-render verification loop in which the formula calculation engine 424 evaluates formulas for errors and the screenshot renderer 430 renders the worksheet for visual inspection prior to completion. By consulting the skill constraints store 450 during planning and by validating both formula correctness and visual presentation (e.g., layout and number formats) via the recalculation and rendering steps, the generative response engine 220 is more likely to produce a workbook that satisfies the user's implied spreadsheet conventions without requiring substantial manual cleanup.

In some embodiments, the generative response engine 220 may insert citations into the spreadsheet content item, such as by inserting at least one note or comment associated with a cell to store a citation corresponding to a value in the cell, and/or by generating a citations column adjacent to a table region such that rows in the table region have corresponding citation entries.

In some embodiments, the generative response engine 220 generates a change log worksheet that includes at least one row describing modifications performed by the generative response engine 220. These features improve transparency, auditability, and user confidence in spreadsheets produced from prompts that may incorporate external data sources.

In some embodiments, the example system 400 supports concurrent edits by a user and the generative response engine 220, such as when a user edits a spreadsheet in parallel with agent actions. The intermediate spreadsheet representation 426 enables edits to be represented as operation-based differences, and the example system 400 applies operation-based differences in an order determined to resolve conflicts between edits to the same cell or range. This operation-based approach provides a practical mechanism for co-editing spreadsheets that is difficult to implement reliably when operating directly on low-level Open XML markup.

The example system 400 provides a spreadsheet-agent architecture in which the generative response engine 220 leverages a model-optimized spreadsheet artifact tool 420 exposing high-intent semantic editing operations, the intermediate spreadsheet representation 426 that avoids direct Open XML manipulation, integrated formula evaluation and caching through the formula calculation engine 424, and render-to-image visual validation via screenshot renderer 430 and the validation controller 440, guided by spreadsheet-specific constraints stored in the skill constraints store 450. The example system 400 may improve reliability and usability of agent-generated spreadsheets by reducing formula defects, enabling iterative detection and remediation of errors, supporting professional formatting and layout validation, and providing transparent change summaries and citations, while generating output spreadsheet files compatible with the native spreadsheet editor 460.

Figure 5:
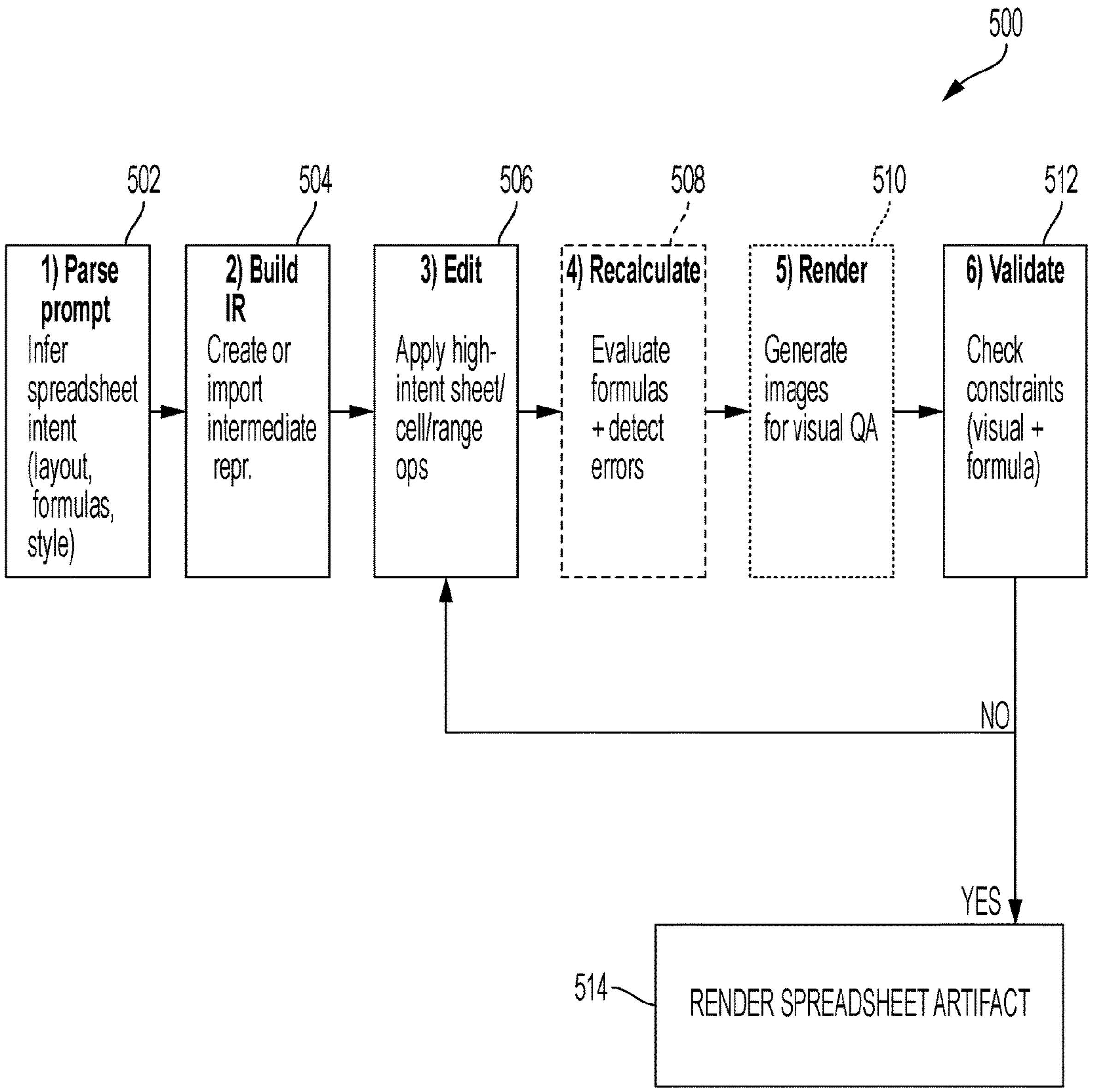
FIG. 5 is a diagram illustrating a validation process in which a candidate spreadsheet artifact is validated as satisfying at least a portion of spreadsheet specific constraints according to some aspects of the disclosure.

FIG. 5 is a diagram illustrating a validation process 500 in which a candidate spreadsheet artifact is validated as satisfying at least a portion of spreadsheet specific constraints according to some aspects of the disclosure.

The components of the validation process 500 depicted in FIG. 5, and the arrangement thereof, are provided for explanatory purposes. Additional components may be included, fewer components may be used, and the illustrated arrangement of the validation process 500 may be modified without departing from the scope of the present disclosure.

The validation process 500 is for composing a spreadsheet content item and verifying that the spreadsheet content item satisfies at least a portion of spreadsheet-specific constraints, including formula correctness constraints and visual formatting constraints, prior to displaying or rendering of the spreadsheet content item. In some embodiments, the validation process 500 is performed by the generative response engine 220 of FIGS. 2 and 4) in cooperation with the spreadsheet artifact tool 420 of FIG. 4 that supports programmatic spreadsheet editing, formula evaluation, and rendering to images and the validation controller 440 of FIG. 4.

The validation process 500 is a validation loop that includes operations 502-512. The validation process 500 conditionally iterates based on whether validation succeeds. When validation succeeds ("YES"), the system outputs a validated spreadsheet artifact at step 514. When validation fails ("NO"), the system returns to an editing operation at 506 and repeats one or more portions of the loop until the candidate spreadsheet item satisfies the applicable constraints or a portion thereof.

Specifically, at 502, the validation process 500 involves the generative response engine 220 parsing a prompt that defines an agentic task to compose a spreadsheet content item. In some embodiments, parsing the prompt includes determining spreadsheet intent that may be implicit in the prompt, including at least one of: a target worksheet structure (e.g., one sheet or multiple sheets), a target layout (e.g., header rows, section boundaries, totals rows, input regions, output regions), a set of formulas needed to compute derived values, and a target style or formatting approach (e.g., number formats, visually distinct headers, borders delineating sections, and other readability features).

In some embodiments, at 502, the validation process 500 further includes the generative response engine 220 selecting one or more spreadsheet-specific constraints (e.g., formula constraints and/or formatting constraints) from the skill constraints store 450 that are to be validated at 512. For example, the constraints may include requirements that derived values be expressed using formulas rather than hard-coded values, that formulas avoid certain function classes, and that the output spreadsheet content item does not contain formula error values.

At 504, the generative response engine 220 using the spreadsheet artifact tool 420 builds intermediate spreadsheet representation 426 for the spreadsheet content item. In some embodiments, building the intermediate spreadsheet representation 426 includes creating a new workbook representation. In other embodiments, building the intermediate spreadsheet representation 426 includes importing an existing spreadsheet in an excel file format for example into the intermediate spreadsheet representation 426 (e.g., when the agentic task is an edit task applied to a preexisting workbook).

In some embodiments, the intermediate spreadsheet representation 426 is a structured workbook representation with nodes representing worksheets and a plurality of cells (or ranges of cells), where each cell is associated with a cell address and one or more attributes including at least one of: a cell value, a cell formula, and a cell format attribute. By operating on the intermediate spreadsheet representation 426, the spreadsheet artifact tool 420 may perform view, edit, create operations on the spreadsheet content item without requiring manipulation of raw spreadsheet file markup.

At 506, the validation process 500 includes the generative response engine 220 using the spreadsheet artifact tool 420 applying one or more spreadsheet editing operations to compose a spreadsheet content item. In some embodiments, the editing operations include high-intent operations corresponding to semantic spreadsheet editing actions such as editing a worksheet, a cell, or a cell range. Examples include setting values over a range, setting formulas over a column or range, inserting a totals row, applying number formats, applying header formatting, adjusting row heights/column widths, merging cells for titles, adding borders to delineate section boundaries, and creating conditional formatting rules. The generative response engine 220 issues the high-intent editing operations, which are translated by the spreadsheet API 422 of the spreadsheet artifact tool 420, an example described in FIG. 4.

In some embodiments, at 506, the validation process 500 includes the formula calculation engine 424 generating derived values using spreadsheet formulas rather than hard-coded values. The formula calculation engine 424 generates human-editable formulas such as formulas that are short, legible, and understandable by a human user. When a computation would otherwise require an overly long or complex formula, the formula calculation engine 424 creates helper/intermediate calculation cells and rewrites downstream formulas to reference those helper cells.

In some embodiments, at 506, the validation process 500 includes generating and applying one or more high-intent editing operations to create a conditional formatting rule applied to at least one range of the spreadsheet content item. The conditional formatting rule may include a formula-based condition (e.g., a condition that checks whether a cell is blank, whether a value is above a threshold, or whether a computed metric is out of range).

In some embodiments, at 506, the validation process 500 includes inserting citations within the spreadsheet content item. For example, the generative response engine 220 may insert a note or comment associated with a cell to store a citation corresponding to a value in the cell and/or a citations column adjacent to a table region such that rows in the table region have corresponding citation entries.

At 508, the validation process 500 involves the formula calculation engine 424 recalculating spreadsheet formulas in a candidate spreadsheet content item to produce recalculation results. In some embodiments, recalculation is performed after one or more editing operations performed at 506. In some embodiments, recalculation is performed after a subset of invoked editing operations, such as after each high-intent editing operation that modifies at least one cell formula, or after a batch of high-intent editing operations that collectively modify a range of cells.

In some embodiments, the formula calculation engine 424 automatically recalculates formulas when edits are made, and also provides an explicit recalculation operation that may be invoked as a checkpoint after a sequence of edits e.g., by the validation controller 440. The recalculation results may include computed values for formula cells and/or error indicators associated with formula evaluation.

At 508, the generative response engine 220 and/or the validation controller 440 detects one or more formula errors based on the recalculation results. In some embodiments, the detected formula errors include at least one of: a formula evaluation error (e.g., an invalid formula string or unsupported function usage), a reference error (e.g., an invalid or broken cell/range reference), a divide-by-zero error, and an inconsistent-range error (e.g., a formula referencing ranges of mismatched dimensions where aligned ranges are expected).

In some embodiments, detecting formula errors includes identifying cell addresses associated with errors and optionally identifying upstream dependencies that caused the errors (e.g., an input cell value leading to divide-by-zero). In some embodiments, the recalculation results are also used to identify suspicious computed outputs (e.g., unexpected zeros or outliers) even if a formal spreadsheet error token is not produced, such that corrective edits may still be applied.

At 510, the validation process 500 involves the screenshot renderer 430 rendering at least a portion of the candidate spreadsheet content item to one or more images. In some embodiments, the rendered images depict at least a modified portion of the candidate spreadsheet content item e.g., raster images. In some embodiments, the rendered images depict a full worksheet, including visible cell borders, row and column layout, and formatted headers e.g., montage image.

In some embodiments, rendering is performed after recalculation at 508 such that the rendered images reflect up-to-date computed values produced by formula evaluation. This ordering improves the reliability of visual validation because the rendered images show the computed results that would be displayed to a user on the user interface 412 rather than stale or uncached values.

At 512, the validation process 500 involves the validation controller 440 validating the candidate spreadsheet content item against one or more constraints in the skill constraints store 450. In some embodiments, validation includes a combination of formula-related constraints and visual validation constraints. Formula-related validation at 512 may include the validation controller 440 determining whether recalculation completed without detected formula errors, derived values are represented using formulas rather than hard-coded values, and/or formulas satisfy one or more formula style constraints (e.g., human-editable formulas).

In some embodiments, validating formula style includes enforcing a stored formula readability policy requiring formulas to satisfy a readability criterion. The readability criterion may include, for example, a maximum formula length threshold, a maximum number of nested functions, a maximum parse-tree depth, and/or a maximum count of operators, function calls, or cell-range references. When a formula violates the readability criterion, the validation controller 440 may treat the violation as a validation failure (or as a scored penalty) that triggers additional editing and refactoring by the generative response engine 220.

Visual validation at 512 may include the validation controller 440 analyzing the rendered image(s) generated at 510 to determine whether the modified portion (or the full worksheet) satisfies one or more visual validation constraints. In some embodiments, the visual validation constraints include at least one of: a first constraint requiring a presence of a title region and at least one border delineating a section boundary, a second constraint requiring consistent formatting across multiple worksheets of the spreadsheet content item, a third constraint requiring a visual distinction between input cells and derived cells, and/or a fourth constraint requiring that number formats render as currency, percent, or dates (as appropriate) rather than as unformatted numbers.

In some embodiments, determining whether at least a portion of the visual validation constraints are satisfied includes performing multimodal inspection of the rendered images (e.g., by a generative model capable of image understanding) and/or performing rule-based inspection of layout attributes and rendered text. The validation output at 512 may be a pass or fail determination If at 512, the output is a fail ("NO"), the validation controller 440 outputs a warning to the generative response engine 220, and the validation process 500 returns to editing at 506. Responsive to a warning from the validation controller 440, the generative response engine 220 generates and applies one or more additional spreadsheet editing operations to remediate detected issues. In some embodiments, if formula errors were detected at 508 and/or at 512, the additional editing operations modify at least one of: cell values, cell formulas, or cell formatting, to correct the formula errors. Non-limiting examples of additional editing operations may include correcting an erroneous reference, resizing a referenced range, adding guard logic to prevent divide-by-zero, or restructuring a formula into helper-cell computations to eliminate an inconsistent-range defect.

If visual validation constraints were not satisfied, remediation edits may include applying additional formatting operations such as adjusting column widths or row heights, applying borders to delineate sections, modifying header styles, adding or correcting titles, applying number formats for the correct data types, and/or applying styles that visually distinguish inputs from derived values.

After applying remediation edits, the validation process 500 again performs recalculations at 508, rendering at 510, and validation at 512, and repeats this loop until validation succeeds ("YES" at 512).

At 514, the validation process 500 renders a validated spreadsheet artifact. In some embodiments, at 514, the validation process 500 includes generating a final rendered representation of the spreadsheet content item for display (e.g., a final worksheet preview) using the custom renderer 414. In some embodiments, the validation process 500 outputs a spreadsheet file (e.g., an XLSX file) suitable for opening in the native spreadsheet editor 460, where the workbook includes the validated formulas and formatting, an example in FIG. 10. The validated output at 514 is thereby more likely to be free of formula defects and more likely to conform to professional spreadsheet layout expectations, reducing user rework and increasing reliability of agent-produced spreadsheets.

The validation process 500 integrates recalculating spreadsheet formulas (automatically upon edits and/or via an explicit recalculation operation) to generate computed results associated with formula cells, with detecting formula errors based on recalculation results, including at least reference errors and divide-by-zero errors, iteratively applying corrective edits (e.g., adjusting cell references, adjusting range dimensions, adding guard logic, or creating helper cells) followed by re-recalculation until one or more error conditions are resolved, and rendering at least a portion of the workbook/worksheet/range after recalculation to visually confirm that displayed computed results and formatting satisfy one or more spreadsheet constraints (e.g., readability and layout consistency). As such, the validation process 500 may provide a structured mechanism for an agentic system to "check its work" during spreadsheet composition. The validation process 500 may reduce the incidence of delivering spreadsheets that contain formula errors or unprofessional formatting. The validation process 500 may also enable automated enforcement of spreadsheet-specific constraints including constraints that are typically implicit in human spreadsheet work (e.g., derived values as formulas, appropriate number formatting, and visually readable layout), thereby improving consistency and user trust in the generated spreadsheet content item.

Figure 6:
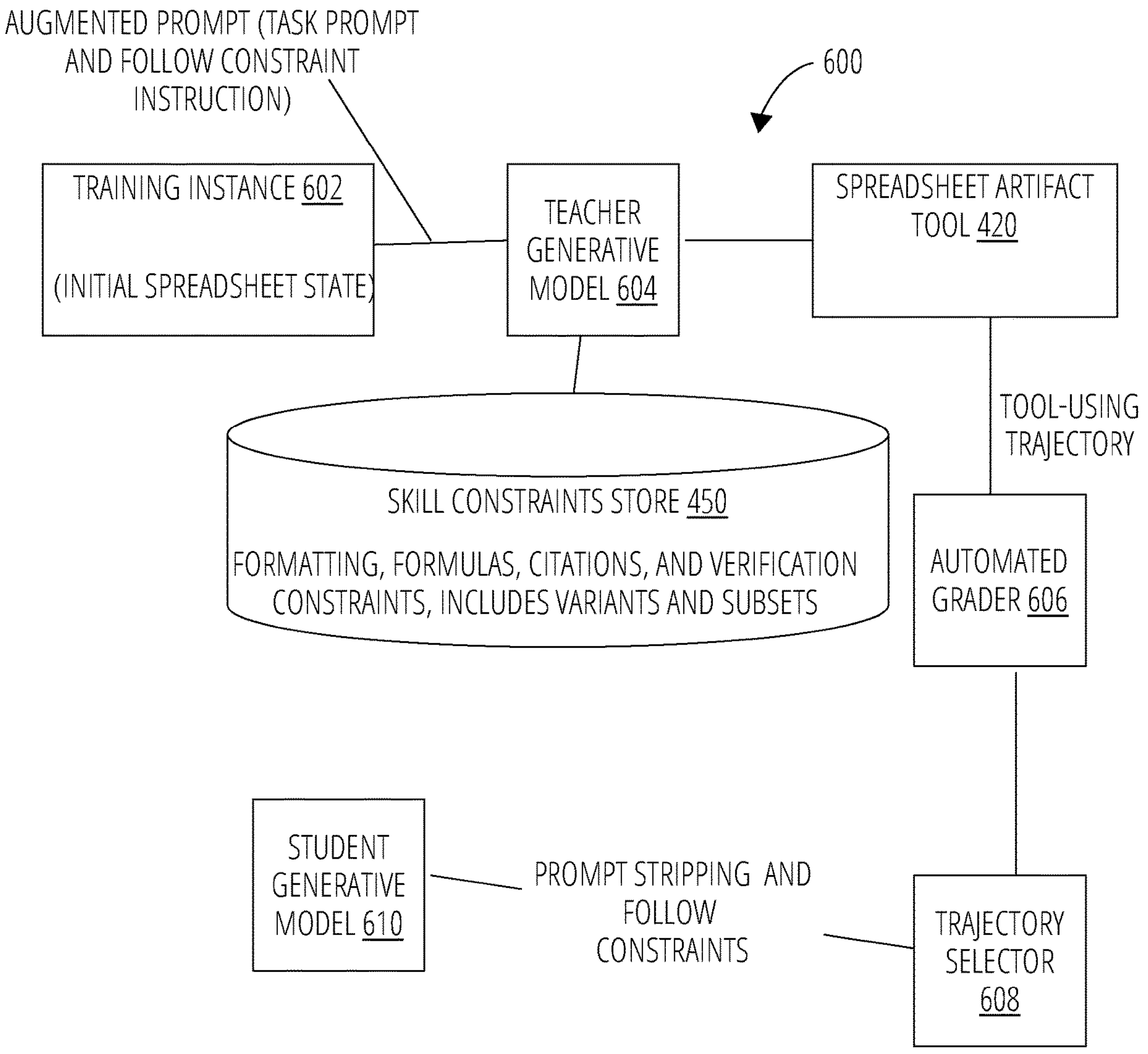
FIG. 6 is a diagram illustrating an example training system for training a generative response engine to perform agentic spreadsheet tasks using a spreadsheet artifact tool while consistently complying with a set of spreadsheet-specific constraints in accordance with some aspects of the disclosure.

FIG. 6 illustrates an example training system 600 for training a generative response engine to perform agentic spreadsheet tasks using a spreadsheet artifact tool 420 while consistently complying with a set of spreadsheet-specific constraints in accordance with some aspects of the disclosure.

The example training system 600 includes a training instance 602, a teacher generative model 604, the spreadsheet artifact tool 420 of FIG. 4 and the skill constraints store 450 of FIG. 4, an automated grader 606, a trajectory selector 608, and a student generative model 610 e.g., the generative response engine 220 of FIGS. 2 and 4.

In some embodiments, the training instance 602 may be generated using a synthetic spreadsheet task generation. For example, the training instance 602 is generated from a corpus of reference spreadsheets (also referred to as "gold spreadsheets") that are generated by human users and treated as high-quality targets. The gold spreadsheets provide an authoritative specification of the intended workbook structure including worksheet organization, cell values, cell formulas, and cell formatting attributes. Each gold spreadsheet is converted into one or more training tasks without requiring manual authoring of prompts or manual labeling, thereby enabling scalable generation of training instances for spreadsheet agent behavior such as the training instance 602.

To create a training task from a given reference spreadsheet, an initial spreadsheet state is generated by modifying the reference spreadsheet to generate an incomplete or erroneous spreadsheet state. In some embodiments, the modification includes applying one or more corruption operations to the reference spreadsheet while maintaining a valid spreadsheet artifact that may be opened and edited. Non-limiting examples of corruption operations include: removing one or more formulas, replacing one or more formulas with values, blanking one or more cells, altering one or more cell references, removing number formatting, removing borders, removing fills, altering row heights, altering column widths, deleting a worksheet, and/or removing a worksheet region. In some embodiments, different corruption operations are applied (or different severities/locations of the corruption operations) to the same reference spreadsheet to generate multiple distinct initial spreadsheet states (variations), thereby increasing task diversity and reducing memorization.

After generating the incomplete or erroneous initial spreadsheet state, a synthetic task prompt may be generated. The synthetic task prompt is generated such that it describes an agentic spreadsheet task that instructs restoring, completing, or correcting the initial spreadsheet state toward a target spreadsheet consistent with the reference spreadsheet. In some embodiments, the task prompt describes expected functional outcomes (e.g., reinstate formulas for derived values, correct broken references, restore totals, or rebuild a deleted worksheet region) and/or expected presentation outcomes (e.g., restore professional number formats, restore header styling, restore column widths, and reintroduce borders delineating sections).

The grading rubric may also be generated based on differences between the gold spreadsheet and the corrupted initial spreadsheet state, and may specify objective or semi-objective checks for evaluating whether an output spreadsheet satisfies spreadsheet-specific constraints (formula constraints, formatting constraints, citation constraints, and verification constraints such as recalculation and rendering-based validation). In some embodiments, the rubric includes checks for required structural artifacts such as a change log worksheet and corresponding entries when such constraints are included as a variant.

In some embodiments, the training instance 602 may include at least the synthetic task prompt in addition to the initial spreadsheet state (the corrupted/incomplete spreadsheet). The training instance 602 may further include metadata identifying the applied corruption operation(s) and/or including the generated grading rubric for downstream automated grading. In the training instance 602, the prompt describes the agentic task involving creating or modifying a content item in a spreadsheet format and an initial spreadsheet state (e.g., an initial workbook file, a workbook object, or an initial intermediate representation state) that the teacher generative model 604 is expected to modify using the spreadsheet artifact tool 420.

The training instance 602 is input into the teacher generative model 604. In some embodiments, the teacher generative model 604 is provided with an augmented prompt (e.g., strong prompting) instructing the teacher generative model 604 to access and follow a stored spreadsheet skill/constraint specification in the skill constraints store 450, and to use one or more spreadsheet validation operations (e.g., recalculation and rendering) rather than omitting such operations. The resulting tool-using behavior is graded and selectively distilled into training examples used to update parameters of the student generative model 610 such that the student generative model 610 is more likely to comply with the spreadsheet constraints without requiring the same strong prompting at inference time.

Teacher generative model 604 is configured to generate a tool-using trajectory responsive to the augmented prompt. In some embodiments, the tool-using trajectory includes one or more function calls to the spreadsheet artifact tool 420 to create or modify a spreadsheet content item. The trajectory may include "high-intent" spreadsheet operations (e.g., writing values/formulas to ranges, applying formatting, inserting citations) and validation operations (e.g., formula recalculation and rendering) executed via the spreadsheet artifact tool 420. The teacher generative model 604 drives spreadsheet edits through tool calls without directly manipulating raw XLSX markup, and may invoke validation actions that are difficult or unreliable using conventional libraries alone, such as tool-supported formula evaluation and workbook rendering to images. The spreadsheet artifact tool 420 receives tool calls from teacher generative model 604 and generates outputs used for grading.

The automated grader 606 is configured to analyze the tool-using trajectory and compute a score indicative of compliance with a set of spreadsheet constraints from the skill constraints store 450. In some embodiments, the automated grader 606 determines whether the intermediate spreadsheet representation (or exported workbook) generated by the teacher generative model 604 using the spreadsheet artifact tool 420 satisfies at least a portion of the spreadsheet constraints.

In some embodiments, the automated grader 606 validates that one or more formulas are recalculated and that a formula error is not present in at least one computed cell and validates based on one or more images generated by rendering at least a portion of the spreadsheet that a visual formatting constraint is satisfied. The automated grader 606 computes the score using a grading rubric generated for the training instance 602. In some embodiments, the automated grader 606 includes another generative model distinct from teacher generative model 604, and the automated grader 606 applies the rubric to compute the score (or a portion thereof). The score may also incorporate rule-based checks (e.g., presence/absence of formula error tokens, presence of a change log sheet, presence of citations, compliance with formatting rules).

In some embodiments, the set of spreadsheet constraints includes a requirement to generate a change log within the spreadsheet corresponding to the content item and to append at least one row describing one or more changes made during task performance. The automated grader 606 inspects the resulting workbook (or a corresponding intermediate spreadsheet representation) to determine whether the change log is present and populated. The computed score may include a positive contribution when the change log is present and includes the row(s), and a negative contribution when the change log is absent or not populated. This change-log-based scoring may be used as a constraint variant to reduce memorization and increase robustness of constraint-following behavior.

In some embodiments, citation constraints are graded by determining whether citations are included within the spreadsheet in at least one of: cell comments associated with input cells, a citations column adjacent to a table region, or a citations summary region.

The trajectory selector 608 receives grading outputs (e.g., scores, pass/fail determinations, and/or rubric sub-scores) from the automated grader 606 and selects one or more graded trajectories. In some embodiments, the trajectory selector 608 selects trajectories that satisfy a threshold score and/or selects top-ranked trajectories. In some embodiments, the trajectory selector 608 selects a diverse set of trajectories across different constraint variants and/or subsets, thereby improving generalization and reducing overfitting to a single fixed policy statement.

The student generative model 610 e.g., the generative response engine 220 of FIG. 4 is then trained using training examples derived from the selected trajectories. In some embodiments, training examples are generated by transforming one or more selected graded trajectories to remove at least a portion of the "follow constraints" instruction (i.e., prompt stripping) while retaining at least the task prompt and an association between the task prompt and one or more tool-using actions (e.g., calls to spreadsheet artifact tool 420) that create or modify the spreadsheet content item. The parameters of the student generative model 610 are then updated using the training examples. After training, the student generative model 610, when provided the task prompt without the strong prompting instruction to access and follow the constraints, is more likely to generate tool-using trajectories that comply with the spreadsheet constraints (including validation behaviors such as recalculation and rendering, and structured requirements such as citations and change logging).

The example training system 600 enables a practical and data-efficient mechanism for improving spreadsheet agent reliability. By using the teacher generative model 604 under a strong, augmented prompt and grading and the resulting tool-use trajectories for compliance, the example training system 600 may generate high-quality supervised or reinforcement learning training signal for the student generative model 610. Prompt stripping distills constraint-following behavior into the student generative model 610 such that reliable compliance does not depend on repeatedly forcing the same long "read/follow the skill file" prompt at inference time. The use of constraint variants/subsets (e.g., requiring a change log worksheet and scoring for it) reduces memorization and improves robustness. Further, synthetic spreadsheet task generation from gold spreadsheets expands the available training corpus without manual labeling, enabling scaling by adding additional high-quality reference spreadsheets and automatically generating broken initial states, prompts, rubrics, and grading processes for training.

Figure 7:
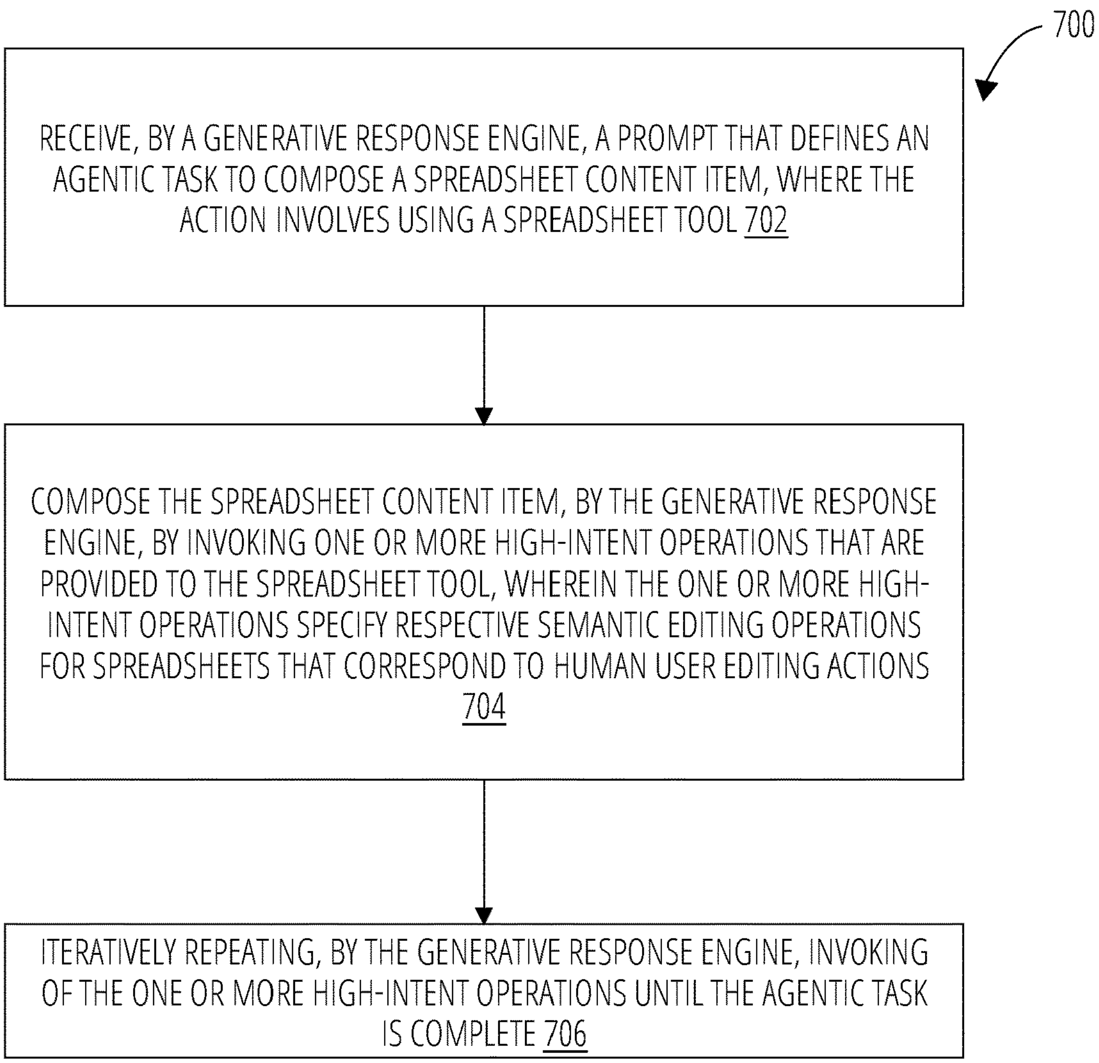
FIG. 7 is a flow diagram of a process for composing a spreadsheet content item using high-intent operations and a spreadsheet tool which translates the high-intent operation into spreadsheet primitives for constructing the spreadsheet content item in accordance with some aspects of the disclosure.

FIG. 7 is a flow diagram of a process 700 for composing a spreadsheet content item using high-intent operations and a spreadsheet tool which translates the high-intent operation into spreadsheet primitives for constructing the spreadsheet content item in accordance with some aspects of the disclosure.

Although the process 700 depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. The process 700 may be performed by the components of the example system 400 of FIG. 4.

According to some examples, in block 702, the process 700 involves receiving, by the generative response engine 220, a prompt that defines an agentic task to compose a spreadsheet content item. The agentic task is one in which the generative response engine 220 performs an action as an agent of a user account. The action involves using a spreadsheet tool such as the spreadsheet artifact tool 420.

In block 704, the process 700 involves composing by the generative response engine 220 the spreadsheet content item. Specifically, the generative response engine 220 invokes one or more high-intent operations that are provided to the spreadsheet artifact tool 420. The one or more high-intent operations specify respective semantic editing operations for spreadsheets that correspond to human user editing actions. The one or more high-intent operations are function calls that cause the spreadsheet tool to apply a transformation to a spreadsheet file that corresponds to a high-intent function call. The one or more high-intent operations include editing operations on a sheet, a cell, or ranges in the spreadsheet content item. The one or more high-intent operations include using a model-optimized interface for spreadsheet editing.

In some embodiments, the spreadsheet artifact tool 420 receives high-intent operations that express semantic spreadsheet edits corresponding to human editing actions, and translates the high-intent operations into updates to core spreadsheet primitives (e.g., worksheet nodes, cell values, cell formulas, range operations, and formatting attributes) in an intermediate spreadsheet representation, and further exports the updated intermediate representation to an XLSX workbook, for example. In other words, the spreadsheet artifact tool 420 is configured to translate high-intent operations into core spreadsheet primitives. For example, the spreadsheet artifact tool 420 translates a single semantic intent (high-intent function call) into a sequence of low-level workbook updates in the intermediate spreadsheet representation (and optionally into a log of those edits), without the agent having to manipulate raw Open XML. For example, a high-intent semantic operation "add a totals row that sums the score column" may be translated into a sequence of core spreadsheet primitives such as: set a label cell value (e.g., A6="Total Score"), set a totals cell formula (e.g., D6="=SUM (D2:D4)"), and optionally apply formatting (bold, border, number format), recalculate formulas to verify computed value and detect errors, and optionally render to confirm it visually appears as intended.

In block 706, process 700 iteratively repeating, by the generative response engine, invoking of the one or more high-intent operations until the agentic task is complete.

Figure 8:
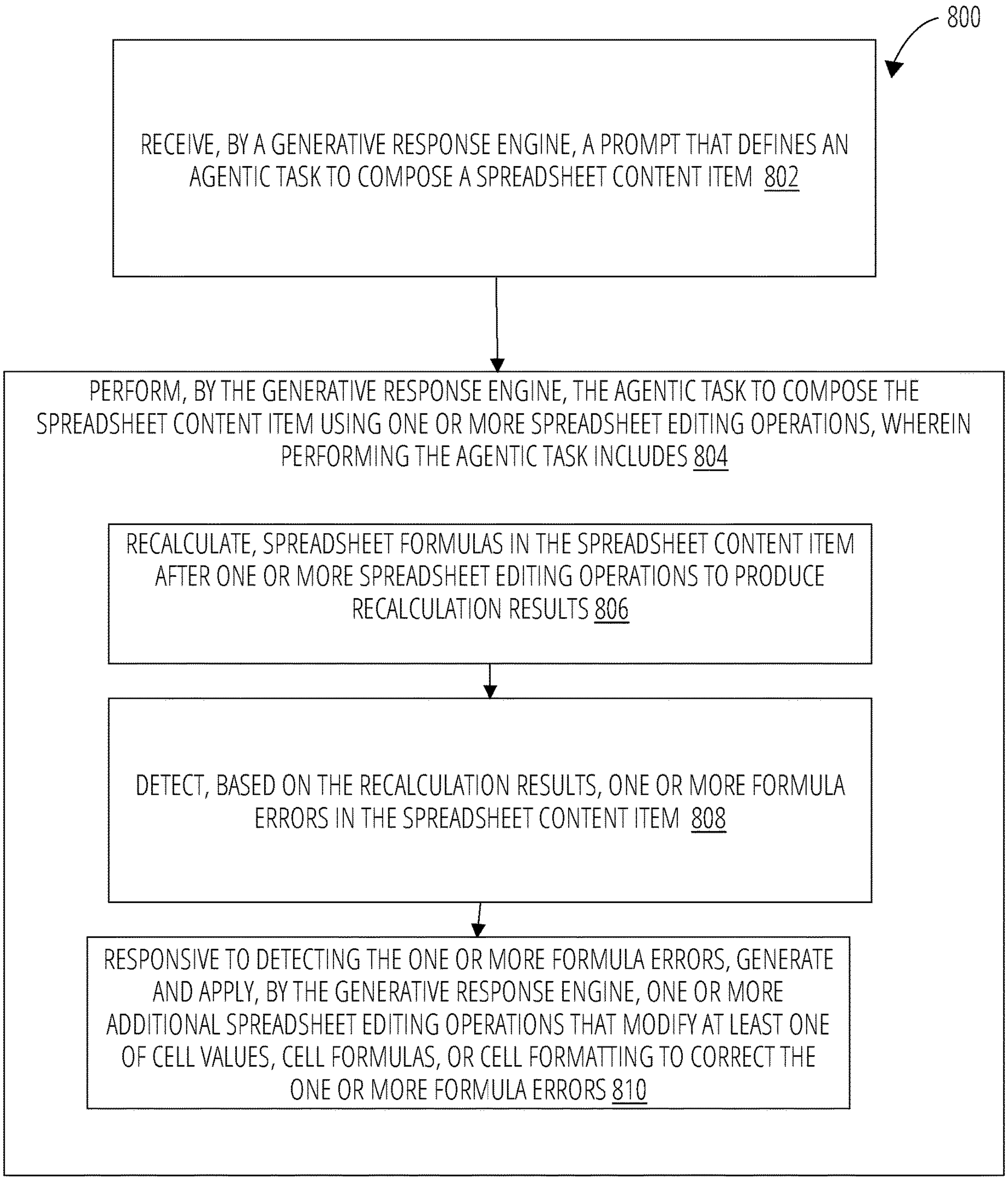
FIG. 8 is a flow diagram of a process for validating a candidate spreadsheet content item using a formula recalculation loop and visual inspection in accordance with some aspects of the disclosure.

FIG. 8 is a flow diagram of a process 800 for validating a candidate spreadsheet content item using a formula recalculation loop and visual inspection in accordance with some aspects of the disclosure.

Although the process 800 depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. The process 800 may be performed by the components of the example system 400 of FIG. 4.

According to some examples, in block 802, the process 800 involves receiving, by the generative response engine 220, a prompt that defines an agentic task to compose a spreadsheet content item. The agentic task is one in which the generative response engine performs an action as an agent of a user account. The action involves using a spreadsheet artifact tool. Composing the spreadsheet content item includes creating or editing the spreadsheet content item.

In block 804, the process 800 involves the generative response engine 220 performing the agentic task to compose the spreadsheet content item using one or more spreadsheet editing operations. Performing the agentic task in block 804 includes block 806, block 808, and block 810.

For example, in block 806, performing the agentic task in block 804 involves the formula calculation engine 424 recalculating spreadsheet formulas in the spreadsheet content item after one or more spreadsheet editing operations to produce recalculation results. In block 808, performing the agentic task in block 804 involves detecting, based on the recalculation results, one or more formula errors in the spreadsheet content item. The one or more formula errors include at least one of: a formula evaluation error, a reference error, a divide-by-zero error, and an inconsistent-range error. In block 810, performing the agentic task in block 804 further involves, responsive to detecting the one or more formula errors, generating and applying, by the generative response engine, one or more additional spreadsheet editing operations that modify at least one of cell values, cell formulas, or cell formatting to correct the one or more formula errors.

Figure 9:
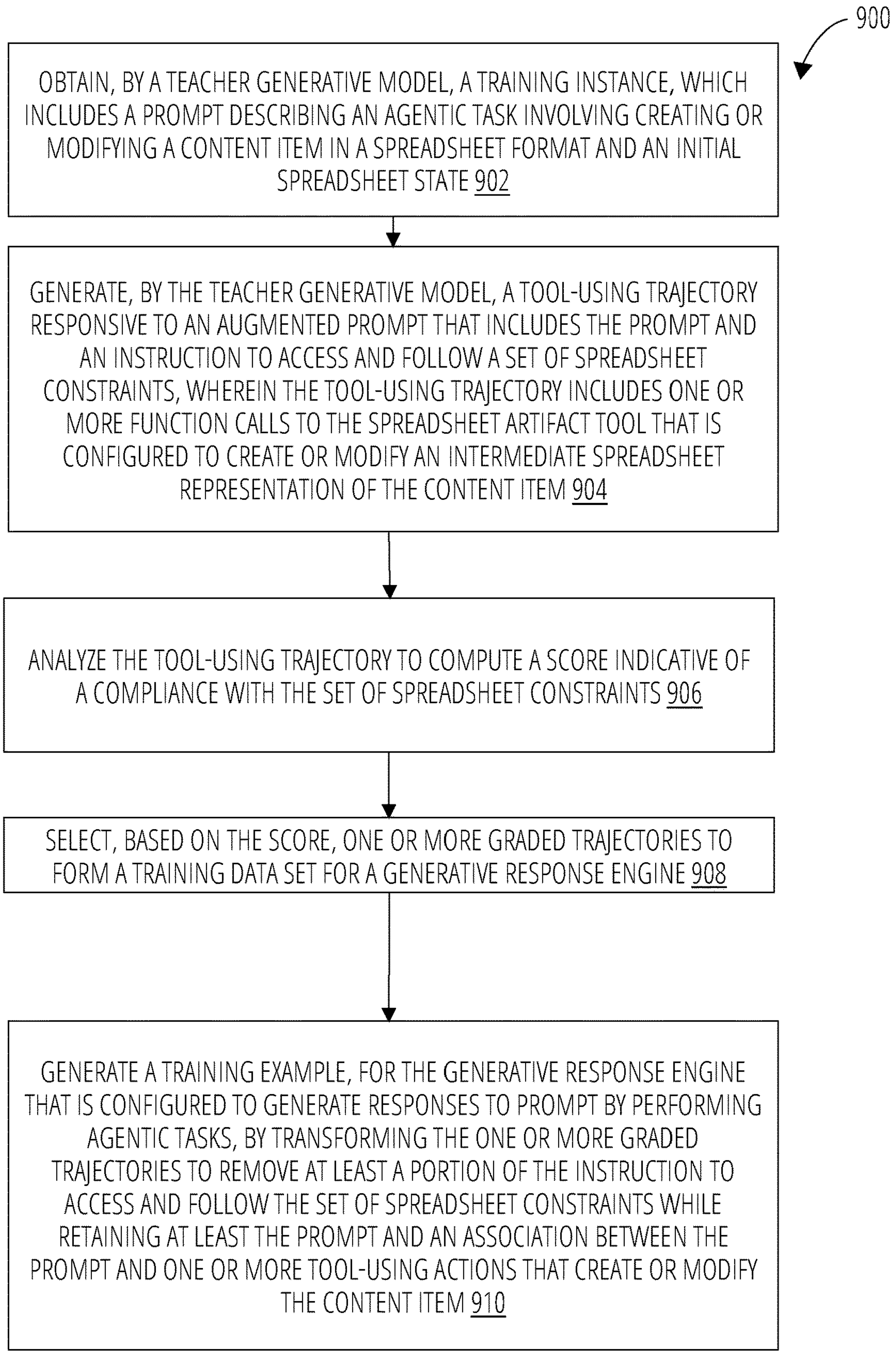
FIG. 9 is a flow diagram of a process for spreadsheet specific training of a generative response engine in accordance with some aspects of the disclosure.

FIG. 9 is a flow diagram of a process 900 for spreadsheet specific training of a generative response engine in accordance with some aspects of the disclosure.

Although the process 900 depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. The process 900 may be performed by the components of the example training system 600 of FIG. 6.

According to some examples, in block 902, the process 900 involves the teacher generative model 604 obtaining a training instance, which includes a prompt describing an agentic task involving creating or modifying a content item in a spreadsheet format and an initial spreadsheet state. The agentic task involves using a spreadsheet artifact tool.

In block 904, the process 900 involves the teacher generative model 604 generating a tool-using trajectory responsive to an augmented prompt that includes the prompt and an instruction to access and follow a set of spreadsheet constraints (e.g., stored in the skill constraints store 450). The tool-using trajectory includes one or more function calls to the spreadsheet artifact tool 420 that is configured to create or modify an intermediate spreadsheet representation of the content item. The set of spreadsheet constraints defines spreadsheet-format-specific constraints for creating or modifying spreadsheets including at least one of: a formula constraint, a formatting constraint, a citation constraint, or a verification constraint.

In block 906, the process 900 involves the automated grader 606 analyzing the tool-using trajectory to compute a score indicative of a compliance with the set of spreadsheet constraints. Analyzing the tool-using trajectory includes using at least one automated grader to compute the score and determining whether the intermediate spreadsheet representation of the content item generated by the spreadsheet artifact tool 420 satisfies at least a portion of the set of spreadsheet constraints.

In block 908, the process 900 involves the trajectory selector 608 selecting, based on the score, one or more graded trajectories to form a training data set for a student generative model 610 e.g., the generative response engine 220.

In block 910, the process 900 involves generates a training example, for the generative response engine that is configured to generate responses to prompt by performing agentic tasks, by transforming the one or more graded trajectories to remove at least a portion of the instruction to access and follow the set of spreadsheet constraints while retaining at least the prompt and an association between the prompt and one or more tool-using actions that create or modify the content item, where parameters of the generative response engine 220 are updated using the training example such that, after training, the generative response engine 220, when provided the prompt without the instruction to access and follow the set of spreadsheet constraints, is more likely to generate the tool-using trajectory that complies with the set of spreadsheet constraints.

In some embodiments, the process 900 involves determining whether the intermediate spreadsheet representation of the content item generated by the spreadsheet artifact tool 420 satisfies at least the portion of the set of spreadsheet constraints by validating that one or more formulas are recalculated and that a formula error is not present in at least one computed cell of the intermediate representation of the content item, e.g., via the formula calculation engine 424 and the validation controller 440 and by validating, based on one or more images generated by rendering at least a portion of the content item in an excel format, that a visual formatting constraint in the set of spreadsheet constraints is satisfied e.g., via the export and translator 428 and/or screenshot renderer 430 and the validation controller 440.

In some embodiments, the process 900 further involves the teacher generative model 604 retrieving, via the augmented prompt, the set of spreadsheet constraints stored as a spreadsheet skill specification in skill constraints store 450 e.g., one or more datastores or memories.

In one form, the block 902 in which the training instance is obtained may further involve generating the training instance using a synthetic spreadsheet task generation pipeline based on a reference spreadsheet generated by a human user, generating the initial spreadsheet state by modifying the reference spreadsheet to generate an incomplete or erroneous spreadsheet state, and generating the prompt describing the agentic task such that the prompt instructs restoring, completing, or correcting the initial spreadsheet state toward a target spreadsheet consistent with the reference spreadsheet.

In one instance, in the block 904 in which the reference spreadsheet is modified may further involve applying at least one corruption operation. The corruption operation includes one or more of removing one or more formulas, replacing the one or more formulas with values, blanking one or more cells, altering one or more cell references, removing number formatting, removing borders, removing fills, altering row heights, altering column widths, deleting a worksheet, or removing a worksheet region.

In another instance, the training instance may further include a grading rubric for evaluating outputs generated in response to the prompt. The block 906 in which the tool-using trajectory is analyzed may involve computing the score using the grading rubric.

According to some examples, the automated grader 606 may be provided, which is another generative model distinct from the teacher generative model 604. The another generative model applies the grading rubric to compute the score.

According to some examples, the set of spreadsheet constraints may include a requirement to generate a change log in a spreadsheet corresponding to the content item.

In yet another form, the process 900 may further involve appending at least one row describing one or more changes made to the content item during performance of the agentic task.

In yet another instance, the score may include a positive contribution when the change log is present and includes the at least one row. The score may include a negative contribution when the change log is absent or does not include the at least one row.

According to some examples, the block 904 in which the tool-using trajectory is generated may involve selecting a subset of constraints from the set of spreadsheet constraints and including, in the augmented prompt, an instruction to access and follow the subset of constraints to reduce memorization.

According to some examples, the set of spreadsheet constraints may include a citation constraint by requiring inclusion of citations within the content item in at least one of: cell comments associated with input cells, a citations column adjacent to a table region, or a citations summary region in a spreadsheet.

Figure 10:
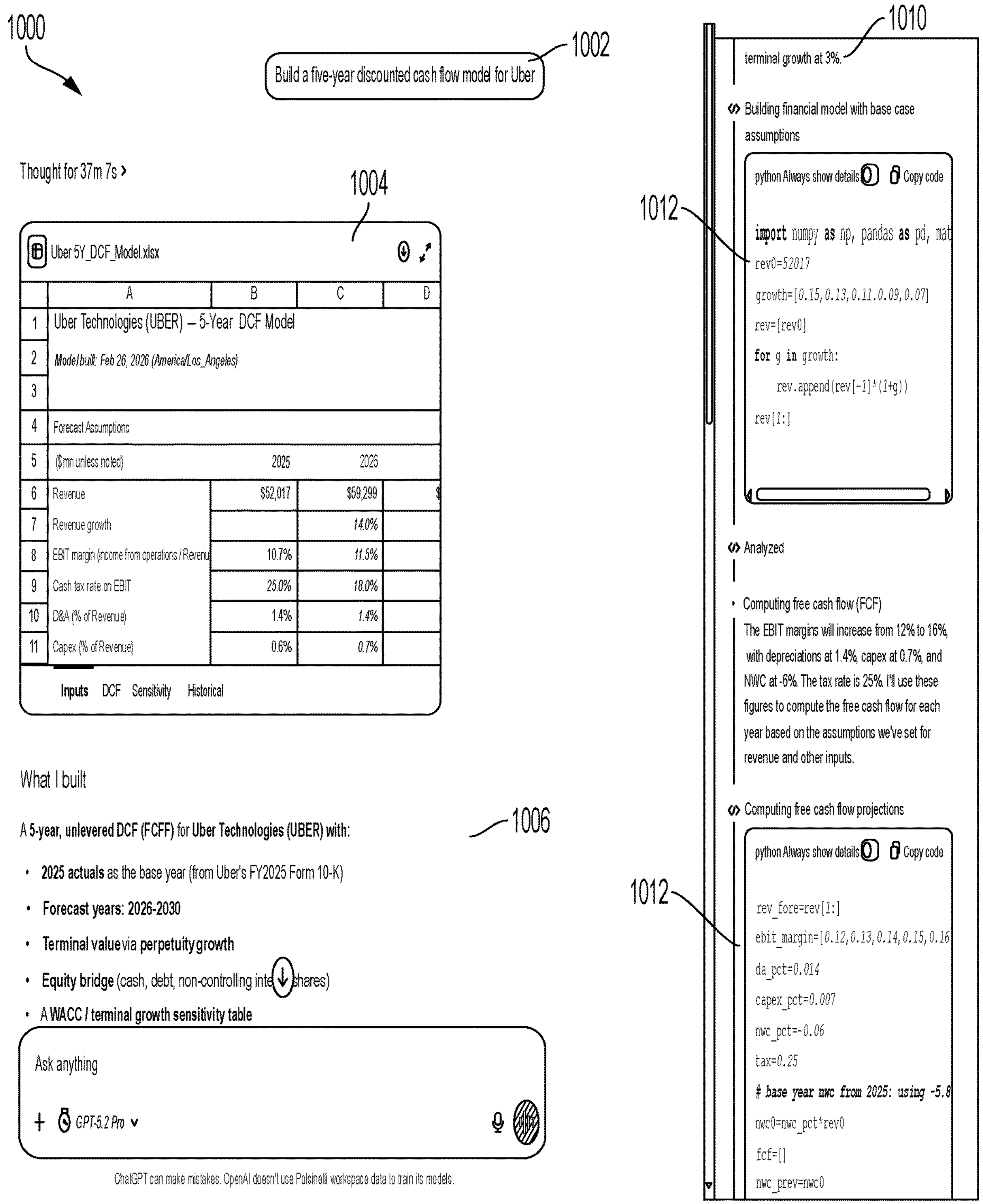
FIG. 10 illustrates an aspect of the subject matter in accordance with one embodiment.

FIG. 10 is a screenshot illustrating a user interface 1000 in which the generative response engine 220 generates and displays a spreadsheet content item based on a prompt in accordance with some aspects of the disclosure.

The user interface 412 executing on the client device 410 enables a user to provide a prompt 1002 defining an agentic spreadsheet task, observe an in-product preview of the resulting spreadsheet content item (a spreadsheet preview 1004), and optionally a description or an explanation 1006 of the generated spreadsheet content item. Additionally, the user interface 1000 includes an internal operations panel 1010 that exposes various operations performed by the generative response engine 220 using the spreadsheet artifact tool 420.

The user interface 1000 presents a prompt region in which a user provides a natural-language request (illustratively, "Build a five-year discounted cash flow model for Uber"), as a prompt 1002. The prompt 1002 defines an agentic task to compose a spreadsheet content item in a spreadsheet format (e.g., an XLSX workbook). Upon receiving the prompt 1002, the generative response engine 220) interprets the prompt 1002 as requiring creation of a structured spreadsheet artifact, including worksheet organization, spreadsheet formulas for derived values (rather than hard-coded outputs), and professional spreadsheet formatting, which may include number formats, section headers, and consistent layout conventions expected by a human analyst. In other words, the generative response engine 220 determines that it would be optimal to generate a response to the prompt 1002 in a spreadsheet format.

After parsing the prompt 1002, the generative response engine 220 composes the spreadsheet content item by invoking one or more spreadsheet editing operations through the spreadsheet artifact tool 420. In some embodiments, the spreadsheet editing operations are invoked as "high-intent operations," where each high-intent operation specifies a semantic spreadsheet editing action that corresponds to a human user editing action (e.g., creating worksheets, setting values for a range, setting formulas for a column, inserting a totals row, applying number formatting, applying header styling, adjusting row heights/column widths, and/or inserting citations). In some embodiments, the generative response engine 220 iteratively repeats invocation of high-intent operations until the agentic task is complete.

When the agentic task is completed, the user interface 1000 includes a spreadsheet preview region that displays spreadsheet preview 1004 in intermediate spreadsheet representation of the generated spreadsheet content item. The spreadsheet preview 1004 may be rendered by the custom renderer 414. For example, the spreadsheet preview 1004 includes a workbook preview (e.g., a rendered view of a worksheet region) and a file identifier (illustratively, "Uber_5Y_DCF_Model.xlsx"), enabling the user to understand the produced spreadsheet artifact and its context. In some embodiments, the intermediate spreadsheet representation corresponds to a structured workbook representation having nodes representing worksheets and cells (or ranges of cells), where cells are associated with cell attributes including at least one of: a cell value, a cell formula, and a cell format. Displaying the spreadsheet content item in the intermediate spreadsheet representation enables the user to review the spreadsheet content item within the same user experience in which the prompt was provided, without requiring immediate opening of a separate native spreadsheet editor e.g., the native spreadsheet editor 460.

In some embodiments, the user interface 1000 additionally displays the explanation 1006. The explanation 1006 may be a natural-language build summary (illustratively labeled "What I built") that explains, in human-readable terms, the structure and scope of the generated spreadsheet content item (e.g., base-year actuals, forecast years, terminal value methodology, equity bridge, and sensitivity analysis). In some embodiments, this summary is generated from (or is consistent with) an ordered log of high-intent operations executed by the generative response engine 220, and the ordered log is converted into a human-readable change description indicating edits and content generated by the generative response engine 220. Such summaries improve transparency by enabling the user to quickly validate that the created spreadsheet components without inspecting every cell.

In some embodiments, the user interface 1000 may further include internal operations panel 1010 that provides a user-visible trace of internal actions performed during task execution. In some embodiments, the internal operations panel 1010 displays (i) intermediate computations performed in a scripting environment (e.g., code blocks showing computations for intermediate values), and (ii) explanatory text describing the computations and steps being performed (e.g., computing revenue projections, computing free cash flow, and similar model subcomponents). In some embodiments, the internal operations panel 1010 additionally indicates that the generative response engine 220 is invoking spreadsheet tooling to perform spreadsheet operations and/or validation operations. The internal operations panel 1010 supports user trust and debuggability by exposing what the generative response engine 220 did and why, and by allowing a user to correlate intermediate computations with the resulting spreadsheet artifact e.g., the spreadsheet preview 1004. For example, the internal operations panel 1010 displays validation operations 1012 including formula recalculation and rendering, prior to completion and/or export of the spreadsheet content item.

In some embodiments, the validation process is performed prior to completing the agentic task and/or prior to exporting the spreadsheet content item. The validation process may include analyzing one or more cell formulas to determine one or more calculated values and associating the calculated values with corresponding cells as cached results. In some embodiments, the validation process includes recalculating spreadsheet formulas after one or more spreadsheet editing operations to produce recalculation results, detecting one or more formula errors (e.g., formula evaluation errors, reference errors, divide-by-zero errors, or inconsistent-range errors), and responsively generating and applying one or more additional spreadsheet editing operations that modify at least one of: cell values, cell formulas, or cell formatting, to correct the formula errors. In some embodiments, the internal operations panel 1010 indicates completion of one or more of validation operations 1012 (e.g., showing a "recalculate" step, detected issues, and remediation actions). In some embodiments, the spreadsheet preview 1004 is generated from (or is consistent with) the rendered image output, thereby enabling the user to view the same visual representation used for validation.

In some embodiments, upon completion of composition and validation, the export and translator 428 causes the spreadsheet content item to be exported as an output spreadsheet file in a spreadsheet format type (e.g., XLSX) and made available for download or opening in the native spreadsheet editor 460. In some embodiments, the exported output spreadsheet file includes cached calculated values produced during the verification process, thereby improving user experience by reducing the likelihood of the user encountering stale formula results or formula error cells immediately upon opening the file.

The user interface 1000 may demonstrate a user experience in which the generative response engine 220 uses the spreadsheet artifact tool 420 to generate a spreadsheet content item from a natural-language prompt, render the spreadsheet in an intermediate spreadsheet representation, and expose (via the internal operations panel 1010) the validation operations 1012 performed to ensure spreadsheet correctness. The arrangement of the user interface 1000 improves usability and reliability by reducing manual rework, reducing formula defects through recalculation and remediation, and improving user trust by providing transparent visibility into intermediate computations and validation operations.

Figure 11A:
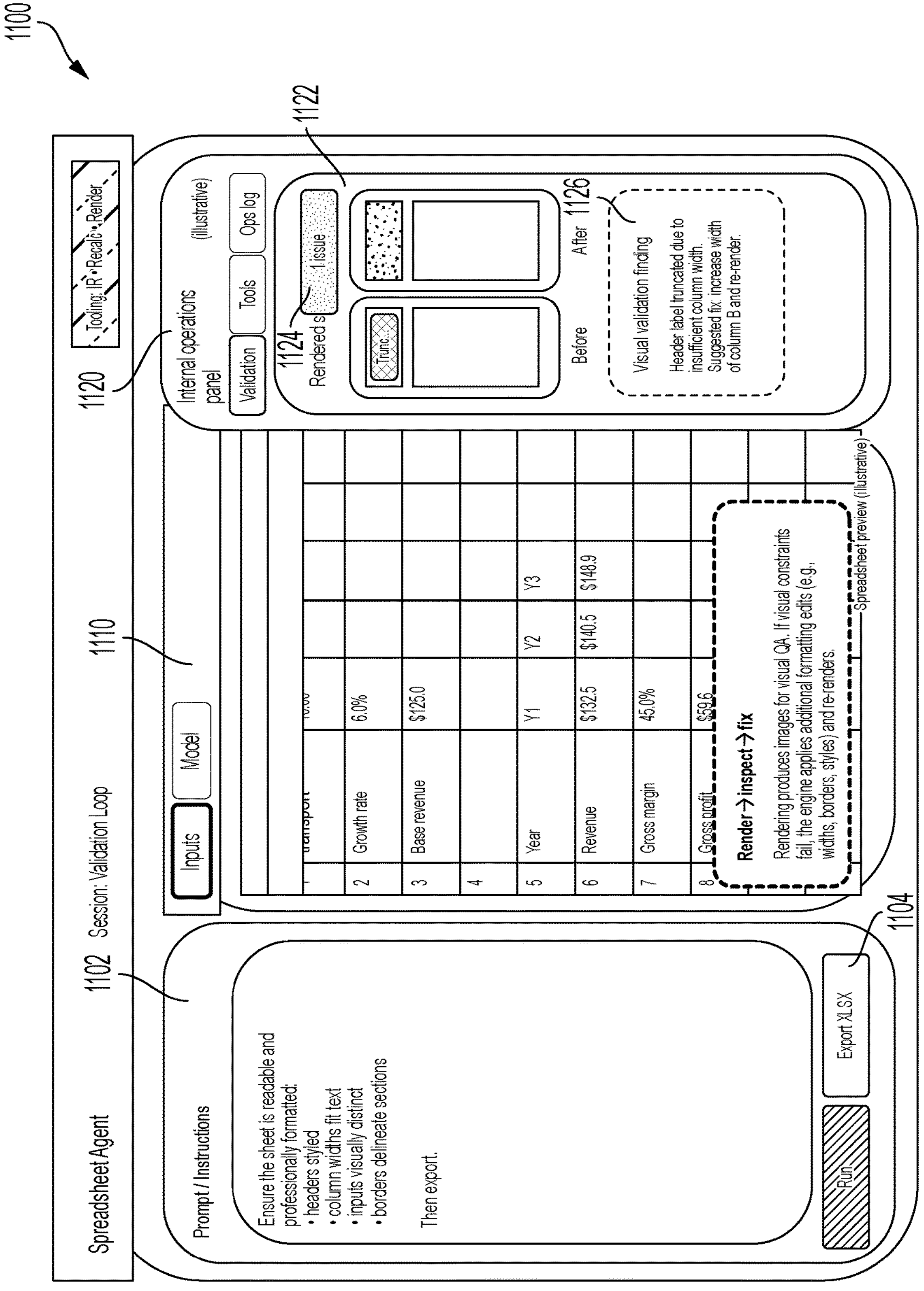
FIGS. 11A-11C are views illustrating various screenshots of a continuous user interface depicting an agentic task performed by a generative response engine in which a spreadsheet content item is being composed and validated in accordance with some aspects of the disclosure.
Figure 11B:
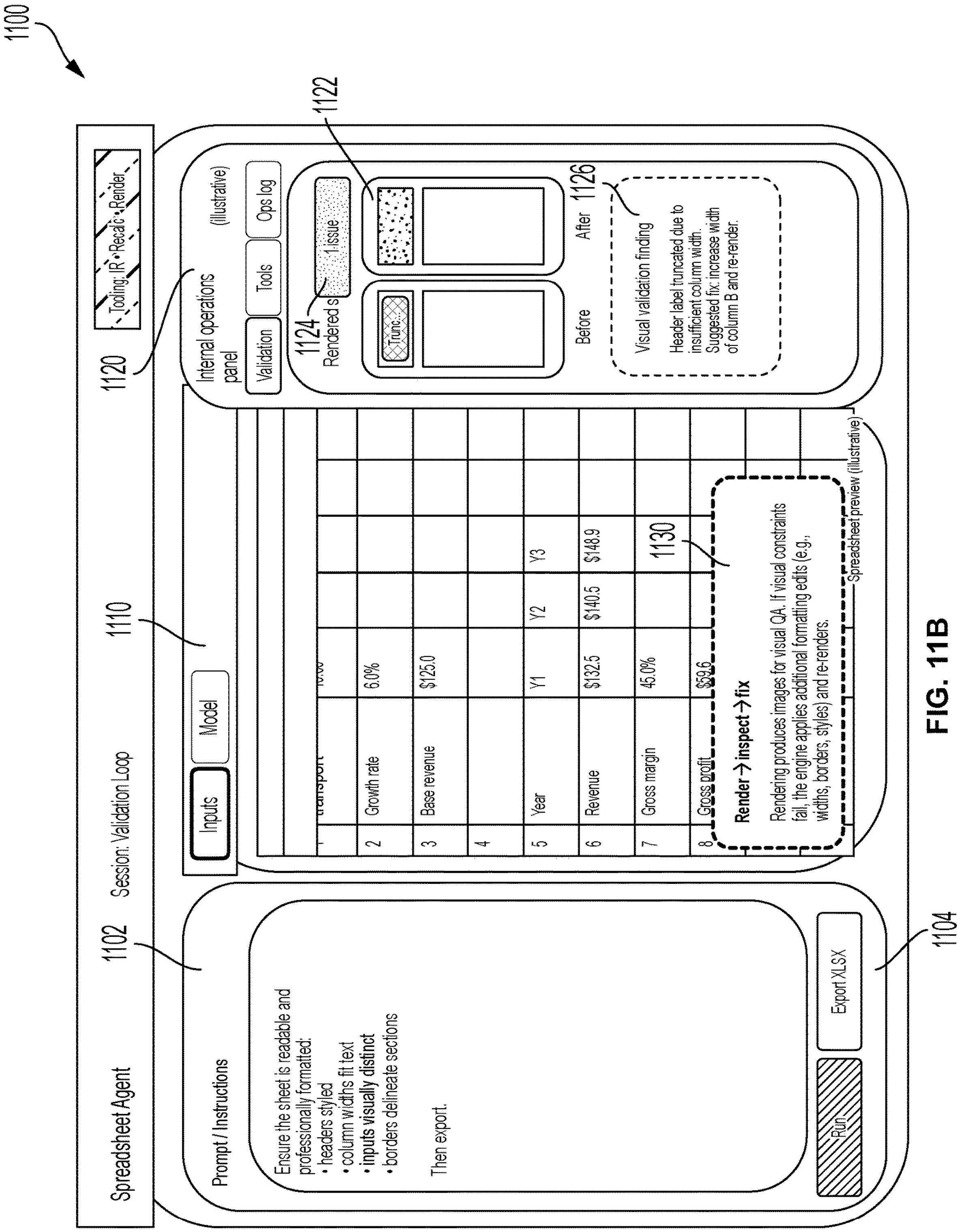
Figure 11C:
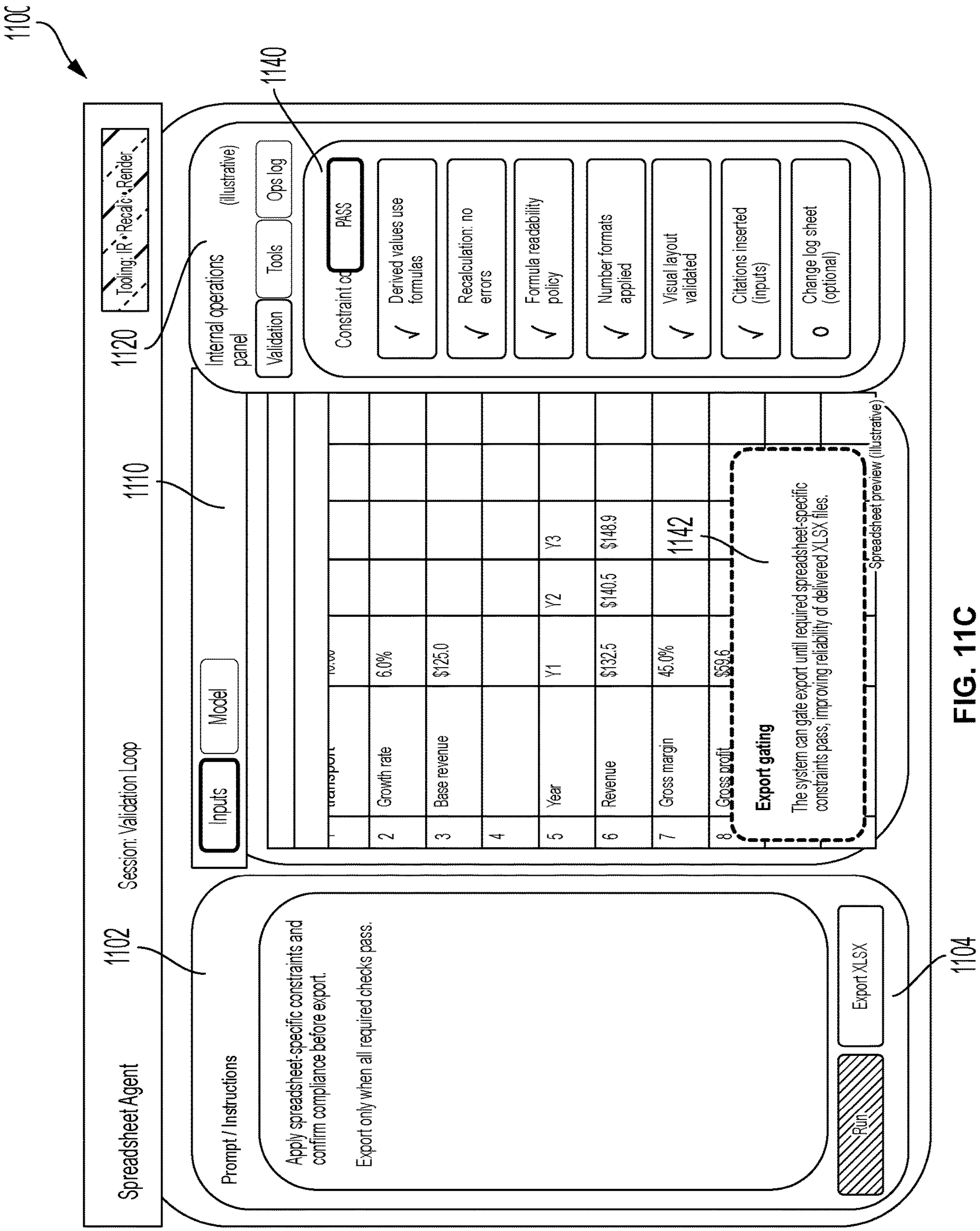

FIGS. 11A-11C are views illustrating various screenshots of a continuous user interface 1100 depicting an agentic task performed by a generative response engine in which a spreadsheet content item is being composed and validated in accordance with some aspects of the disclosure.

For example, the agentic task may involve the example system 400 of FIG. 4. The agentic task, by way of an example, involves creating a three year revenue model. Based on the prompt, the generative response engine 220 may determine that the response is to be provided in a spreadsheet workbook format, e.g., an exportable spreadsheet file (e.g., XLSX). In some embodiments, the continuous user interface 1100 is rendered on the user interface 412 on the client device 410, and the agentic operations are executed by the generative response engine 220 using the spreadsheet artifact tool 420 that supports generating the intermediate spreadsheet representation 426 that may be rendered on the user interface 412 using the custom renderer 414 and that supports validation process involving recalculation and rendering using the formula calculation engine 424 and the screenshot renderer 430 and the validation controller 440.

In some embodiments, the continuous user interface 1100 includes prompt/instruction 1102 e.g., compose or edit instruction. The prompt/instruction 1102 may be a spreadsheet-specific instruction that the user expects a human analyst to follow (e.g., "ensure the sheet is readable and professionally formatted," "headers styled," "inputs visually distinct," and "borders delineate sections"). Such instructions correspond to spreadsheet-specific constraints that can be stored in the skill constraints store 450 and enforced by the generative response engine 220 including formula constraints, formatting constraints, citation constraints, and verification constraints.

The continuous user interface 1100 further includes control elements 1104 such as a run control that initiates execution of the agentic spreadsheet task. Upon user selection of the run control, the generative response engine 220 interprets the prompt and composes the spreadsheet content item by invoking one or more high-intent operations (e.g., sheet/cell/range edits, formula insertion, and formatting) via the spreadsheet artifact tool 420. In some embodiments, the spreadsheet content item is displayed within an intermediate spreadsheet representation (a structured workbook representation with nodes representing sheets and cells and associated cell attributes such as values, formulas, and formats) that is easy for the generative response engine 220 to manipulate and update while performing the agentic task. The control elements 1104 may further include an export control (e.g., "Export XLSX"). In some embodiments, export control is gated such that export is inhibited until the generative response engine 220 using the validation controller 440 determines that required spreadsheet-specific constraints and verification checks have passed. This export gating is a helpful user-experience feature because spreadsheet correctness is often not apparent until a file is opened in the native spreadsheet editor 460. As such, gating by the validation controller 440, reduces delivery of broken or unprofessional spreadsheets.

The continuous user interface 1100 further includes a spreadsheet preview 1110, which is a preview of at least a portion of the spreadsheet content item. In some embodiments, a spreadsheet preview region displays a worksheet grid (including visible row/column structure) and reflects applied formatting, allowing the user to review the content without leaving the agent interface.

The continuous user interface 1100 additionally includes an internal operations panel 1120 that provides a user-visible view of operations and validation outcomes performed by the generative response engine 220. In some embodiments, the internal operations panel 1120 includes selectable subpanels such as a validation view, a tools view, and an operations log view. The internal operations panel 1120 provides transparency into the tool usage and validation loop without requiring the user to inspect the underlying workbook files or low-level tool calls. That is, spreadsheet validation primitives (e.g., recalculation and render-to-image inspection) are integrated into the user experience via internal operations panel 1120, rather than treating validation as an offline/manual step.

Turning now to FIG. 11A, FIG. 11A illustrates a state of the continuous user interface 1100 during a validation loop in which the generative response engine 220 has composed and displayed a spreadsheet preview 1110 and has performed (or is performing) validation in accordance with some aspects of the disclosure. In the validation phase of performing the agentic task, the internal operations panel 1120 indicates that the generative response engine 220 executed a render-and-inspect operation (e.g., "Render→inspect→fix"), in which the spreadsheet artifact tool 420 renders at least a portion of the worksheet to one or more images 1122 for visual quality assurance.

In some embodiments, the render operation generates a rendered image set that includes images 1122, which may be thumbnails representing a "before" rendering and an "after" rendering. The internal operations panel 1120 may further include an issue indicator 1124 indicating a quantity of detected issues (e.g., "Rendered sheet: 1 issue"). The issue indicator 1124 is generated based on inspection of the rendered image(s), which may include multimodal inspection by generative response engine 220 and/or rule-based detection of layout defects (e.g., truncated labels, overlapping text, inconsistent headers, missing borders).

In some embodiments, the internal operations panel 1120 may further display visual validation results 1126 describing a detected defect and a remediation suggestion. For example, the visual validation results 1126 may indicate that a header label is truncated due to insufficient column width, and recommends increasing a column width and re-rendering. In some embodiments, this constitutes a determination that a modified portion of the spreadsheet content item fails one or more visual validation constraints (e.g., constraints requiring that content be readable within cell boundaries, that headers be fully visible, and that formatting be consistent). As such, the user is not required to open the spreadsheet content item in a separate editor to discover the defect. The generative response engine 220 detects defects and automatically remediates the defects, improving accuracy and reducing manual rework.

FIG. 11B illustrates a subsequent state of the continuous user interface 1100 in which the generative response engine 220 initiated remediation in accordance with some aspects of the disclosure. In some embodiments, responsive to determining that one or more visual validation constraints are not satisfied, the generative response engine 220 generates and applies one or more additional spreadsheet editing operations to modify the spreadsheet content item. Examples of remediation edits 1130 include: increasing column widths, adjusting row heights, applying or correcting header styling, adding borders to delineate sections, modifying alignment, or applying number formats. The remediation edits 1130 may further involve editing operations that change formulas, spreadsheet formulas are then recalculated to generate recalculation results and detect formula errors. Additional edits to correct formula errors may be applied before re-rendering.

In some embodiments, the remediation edits 1130 are applied as high-intent operations (semantic sheet/cell/range operations corresponding to human editing actions) invoked through the spreadsheet artifact tool 420. After applying the remediation edits 1130, the generative response engine 220 repeats rendering to obtain updated image(s) and repeats visual validation inspection. Accordingly, FIG. 11B represents the iterative nature of the loop: render, inspect, apply edits, re-render, until the formula and visual validation constraint(s) are satisfied. By performing the validation loop, the spreadsheet quality may be improved.

FIG. 11C illustrates a later stage of the continuous user interface 1100 in which the generative response engine 220 has completed validation and determined that the spreadsheet content item satisfies required spreadsheet-specific constraints in accordance with some aspects of the disclosure.

The internal operations panel 1120 displays a constraint compliance summary 1140 that includes a pass indicator (e.g., "PASS") and a list of constraint checks. The constraint compliance summary 1140 provides user-visible confirmation that the generative response engine 220 performed the spreadsheet-specific validation process and that the artifact is ready for export.

In some embodiments, the constraint compliance summary 1140 includes checks corresponding to multiple categories of constraints, such as derived values use formulas (a formula constraint) indicating that computed/derived values are represented using spreadsheet formulas rather than hard-coded values, lack of errors in recalculation (a validation/formula correctness constraint) indicating the recalculated formulas did not yield any formula errors (e.g., reference errors, divide-by-zero errors, evaluation errors, or inconsistent-range errors), a formula style constraint indicating that formulas satisfy one or more human-editability criteria (e.g., length/complexity thresholds and/or use of intermediate helper cells), a formatting constraint indicating that currencies, percentages, and dates (as appropriate) have corresponding number formats and that formatting is consistent with spreadsheet policies, a visual validation constraint indicating that a rendered image inspection confirms readability and professional layout, including header visibility and section delineation, a citation constraint indicating that citations are included in the workbook (e.g., notes/comments on cells and/or a citations column adjacent to relevant inputs), and/or change log sheet constraint indicating a governance feature in which a change log worksheet is created and populated to summarize modifications.

The continuous user interface 1100 may further include an export gating indication 1142, which indicates that the spreadsheet content item is permitted for export and passed required constraints validations. In some embodiments, the spreadsheet preview 1110 is enabled only after the constraint compliance summary 1140 indicates a pass; otherwise the spreadsheet preview 1110 and/or exporting are disabled. This gating provides a user-experience safeguard against delivering spreadsheets that contain formula errors or unprofessional formatting.

Figure 12:
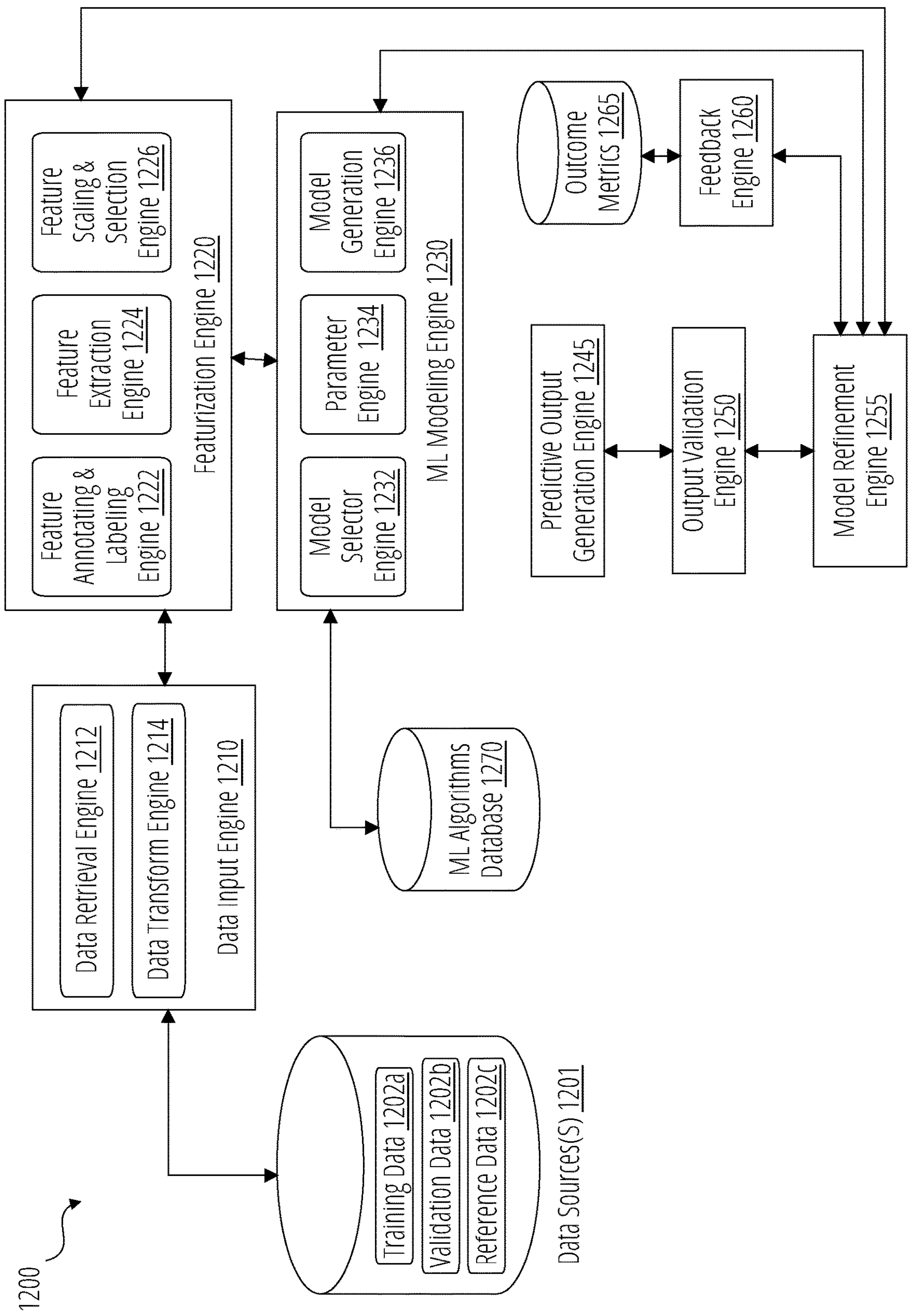
FIG. 12 is a block diagram illustrating an example machine-learning platform in accordance with some aspects of the disclosure.

FIG. 12 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 1200 may include data input engine 1210 that can further include data retrieval engine 1212 and data transform engine 1214. Data retrieval engine 1212 may be configured to access, interpret, request, or receive data, which may be adjusted, reformatted, or changed (e.g., to be interpretable by another engine, such as data input engine 1210). For example, data retrieval engine 1212 may request data from a remote source using an API. Data input engine 1210 may be configured to access, interpret, request, format, re-format, or receive input data from data sources(s) 1201. For example, data input engine 1210 may be configured to use data transform engine 1214 to execute a re-configuration or other change to data, such as a data dimension reduction. In some aspects, data sources(s) 1201 may be associated with a single entity (e.g., organization) or with multiple entities.

Data sources(s) 1201 may include one or more of training data 1202*a* (e.g., input data to feed a machine learning model as part of one or more training processes), validation data 1202*b* (e.g., data against which at least one processor may compare model output with, such as to determine model output quality), and/or reference data 1202*c*. In some aspects, data input engine 1210 can be implemented using at least one computing device. For example, data from data sources(s) 1201 can be obtained through one or more I/O devices and/or network interfaces. Further, the data may be stored (e.g., during execution of one or more operations) in a suitable storage or system memory. Data input engine 1210 may also be configured to interact with a data storage, which may be implemented on a computing device that stores data in storage or system memory.

System 1200 may include featurization engine 1220. Featurization engine 1220 may include feature annotating & labeling engine 1222 (e.g., configured to annotate or label features from a model or data, which may be extracted by feature extraction engine 1224), feature extraction engine 1224 (e.g., configured to extract one or more features from a model or data), and/or feature scaling & selection engine 1226 Feature scaling & selection engine 1226 may be configured to determine, select, limit, constrain, concatenate, or define features (e.g., AI features) for use with AI models.

System 1200 may also include machine learning (ML) modeling engine 1230, which may be configured to execute one or more operations on a machine learning model (e.g., model training, model re-configuration, model validation, model testing), such as those described in the processes described herein. For example, ML modeling engine 1230 may execute an operation to train a machine learning model, such as adding, removing, or modifying a model parameter. Training of a machine learning model may be supervised, semi-supervised, or unsupervised. In some aspects, training of a machine learning model may include multiple epochs, or passes of data (e.g., training data 1202*a*) through a machine learning model process (e.g., a training process). In some aspects, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed aspects in any way, a machine learning model may include millions, billions, or even trillions of model parameters. ML modeling engine 1230 may include model selector engine 1232 (e.g., configured to select a model from among a plurality of models, such as based on input data), parameter engine 1234 (e.g., configured to add, remove, and/or change one or more parameters of a model), and/or model generation engine 1236 (e.g., configured to generate one or more machine learning models, such as according to model input data, model output data, comparison data, and/or validation data).

In some aspects, model selector engine 1232 may be configured to receive input and/or transmit output to ML algorithms database 1270. Similarly, featurization engine 1220 can utilize storage or system memory for storing data and can utilize one or more I/O devices or network interfaces for transmitting or receiving data. ML algorithms database 1270 may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 1270 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 1270 include versions DALL·E, CHAT GPT, and SORA, all provided by OPEN AI.

System 1200 can further include predictive output generation engine 1245 and output validation engine 1250 (e.g., configured to apply validation data to machine learning model output). Predictive output generation engine 1245 can analyze the input and identify relevant patterns and associations in the data it has learned to generate a sequence of words that predictive output generation engine 1245 predicts is the most likely continuation of the input using one or more models from the ML algorithms database 1270, aiming to provide a coherent and contextually relevant answer. Predictive output generation engine 1245 generates responses by sampling from the probability distribution of possible words and sequences, guided by the patterns observed during its training. In some aspects, predictive output generation engine 1245 can generate multiple possible responses before presenting the final one. Predictive output generation engine 1245 can generate multiple responses based on the input, and these responses are variations that predictive output generation engine 1245 considers potentially relevant and coherent. Output validation engine 1250 can evaluate these generated responses based on certain criteria. These criteria can include relevance to the prompt, coherence, fluency, and sometimes adherence to specific guidelines or rules, depending on the application. Based on this evaluation, output validation engine 1250 selects the most appropriate response. This selection is typically the one that scores highest on the set criteria, balancing factors like relevance, informativeness, and coherence.

System 1200 can further include feedback engine 1260 (e.g., configured to apply feedback from a user and/or machine to a model) and model refinement engine 1255

(e.g., configured to update or re-configure a model). In some aspects, feedback engine 1260 may receive input and/or transmit output (e.g., output from a trained, partially trained, or untrained model) to outcome metrics database 1265. Outcome metrics database 1265 may be configured to store output from one or more models and may also be configured to associate output with one or more models. In some aspects, outcome metrics database 1265, or other device (e.g., model refinement engine 1255 or feedback engine 1260), may be configured to correlate output, detect trends in output data, and/or infer a change to input or model parameters to cause a particular model output or type of model output. In some aspects, model refinement engine 1255 may receive output from predictive output generation engine 1245 or output validation engine 1250. In some aspects, model refinement engine 1255 may transmit the received output to featurization engine 1220 or ML modeling engine 1230 in one or more iterative cycles.

The engines of system 1200 may be packaged functional hardware units designed for use with other components or a part of a program that performs a particular function (e.g., of related functions). Any or each of these modules may be implemented using a computing device. In some aspects, the functionality of system 1200 may be split across multiple computing devices to allow for distributed processing of the data, which may improve output speed and reduce computational load on individual devices. In some aspects, system 1200 may use load-balancing to maintain stable resource load (e.g., processing load, memory load, or bandwidth load) across multiple computing devices and to reduce the risk of a computing device or connection becoming overloaded. In these or other aspects, the different components may communicate over one or more I/O devices and/or network interfaces.

System 1200 can be related to different domains or fields of use. Descriptions of aspects related to specific domains, such as natural language processing or language modeling, is not intended to limit the disclosed aspects to those specific domains, and aspects consistent with the present disclosure can apply to any domain that utilizes predictive modeling based on available data.

Figure 13A:
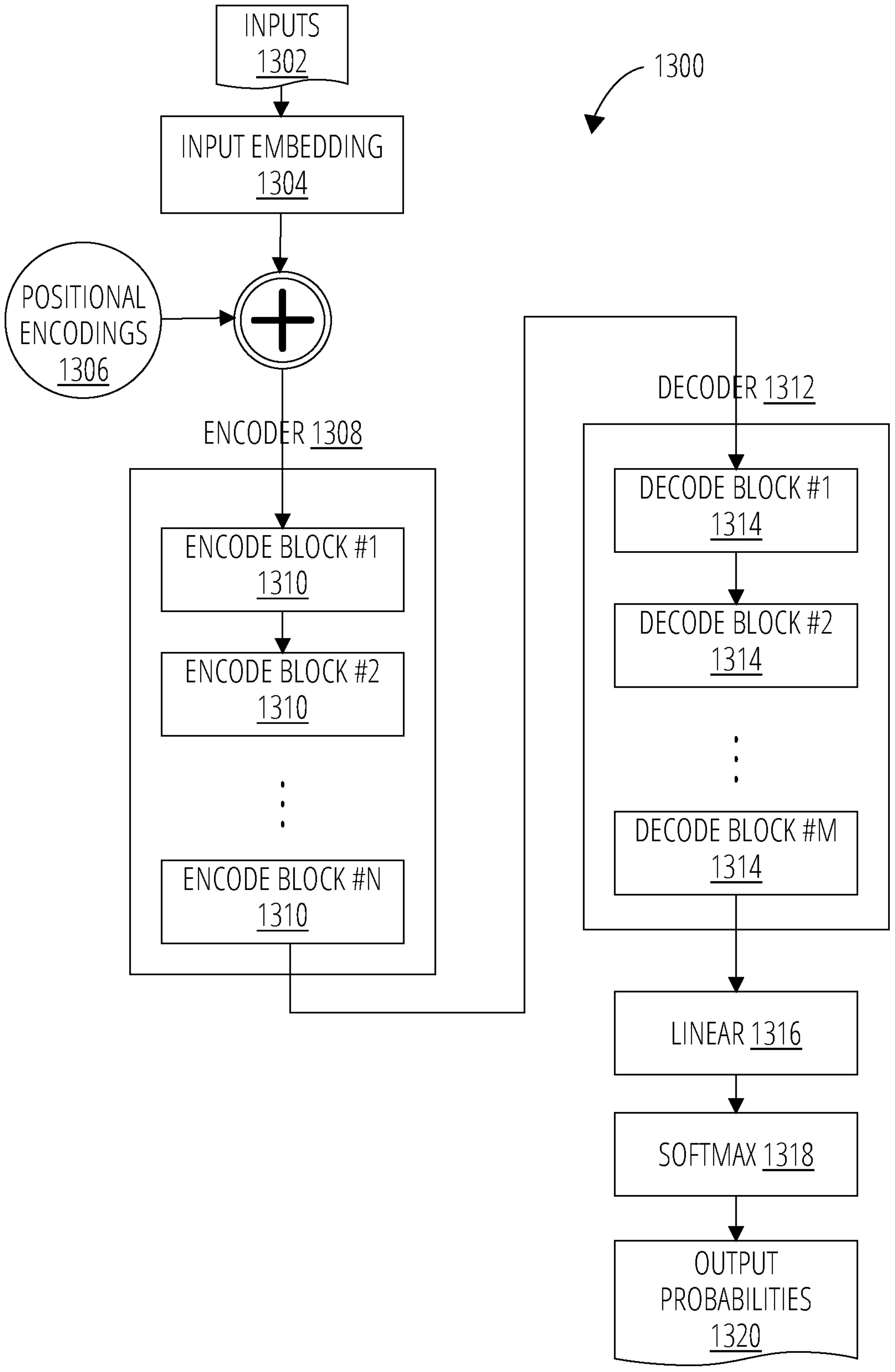
FIG. 13A, FIG. 13B, and FIG. 13C illustrate an example transformer architecture in accordance with some aspects of the disclosure.
Figure 13B:
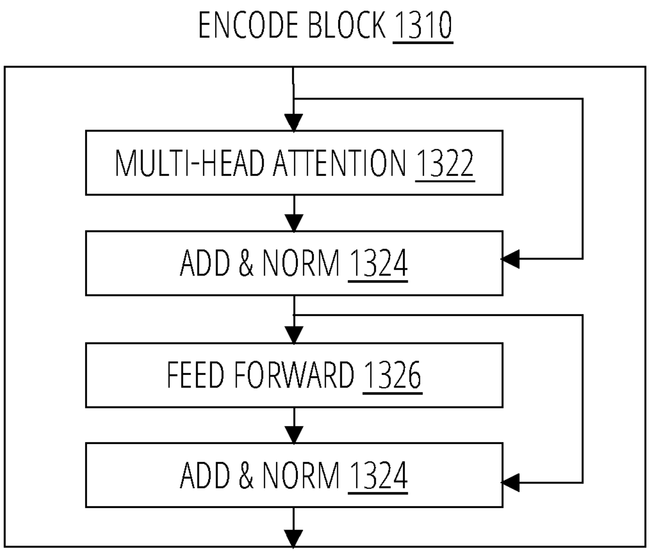
Figure 13C:
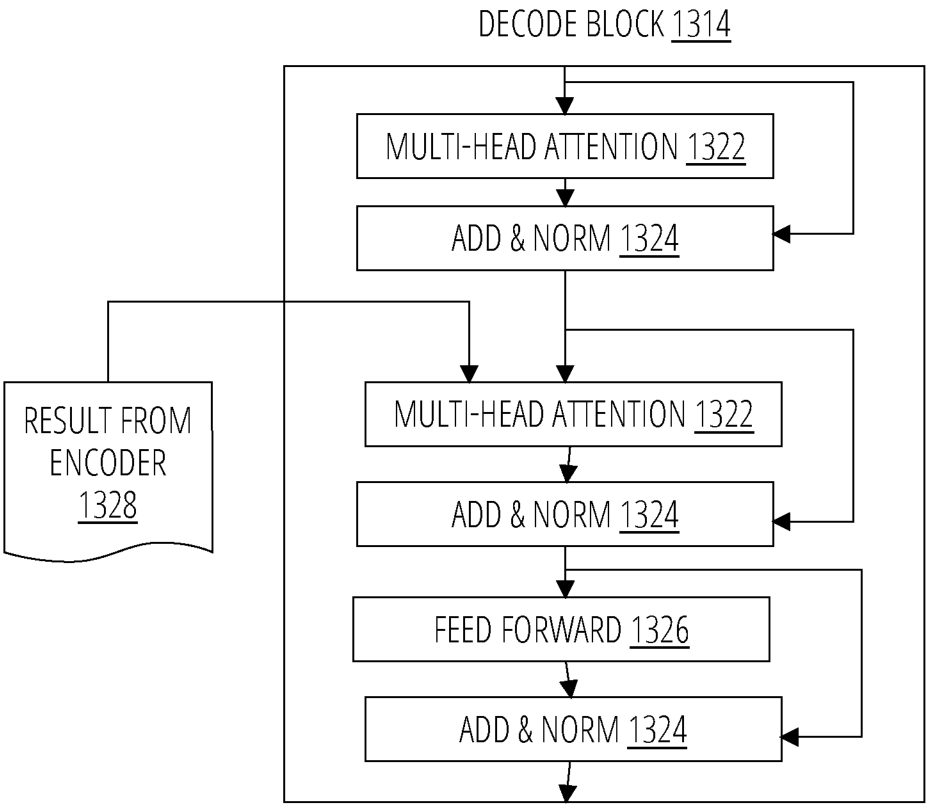

FIG. 13A, FIG. 13B, and FIG. 13C illustrates an example transformer architecture in accordance with some aspects of the present technology. Examples of ML models that use a transformer neural network (e.g., transformer architecture 1300) can include, e.g., generative pretrained transformer (GPT) models and Bidirectional Encoder Representations from Transformer (BERT) models. The transformer architecture 1300, which is illustrated in FIG. 13A, FIG. 13B, and FIG. 13C, includes inputs 1302, input embedding block 1304, positional encodings 1306, encoder 1308 including encode blocks 1310, decoder 1312 including decode blocks 1314, linear block 1316, softmax block 1318, and output probabilities 1320.

Input embedding block 1304 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 1304 can be learned embeddings to convert the input tokens and output tokens to vectors of dimension that have the same dimension as the positional encodings, for example.

Positional encodings 1306 provide information about the relative or absolute position of the tokens in the sequence. According to certain non-limiting examples, positional encodings 1306 can be provided by adding positional encodings to the input embeddings at the inputs to the encoder 1308 and decoder 1312. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 1308 can use stacked self-attention and point-wise, fully connected layers. Encoder 1308 can be a stack of N identical layers (e.g., N=6), and each layer can be an encode block, as illustrated by encode block 1310 shown in FIG. 13B. Each encode block 1310 has two sub-layers: (i) a first sub-layer has a multi-head attention block 1322 and (ii) a second sub-layer has a feed forward block 1326, which can be a position-wise fully connected feed-forward network. The feed forward block 1326 can use a rectified linear unit (ReLU).

Encoder 1308 uses a residual connection around each of the two sub-layers, followed by an add & norm block 1324, which performs normalization. For example, the output of each sub-layer can be LayerNorm (x+Sublayer(x)). To facilitate these residual connections, all sub-layers in the model, as well as the embedding layers, produce output data having a same dimension.

Similar to encoder 1308, decoder 1312 uses stacked self-attention and point-wise, fully connected layers. Decoder 1312 can also be a stack of M identical layers (e.g., M=6), and each layer can be a decode block, as illustrated by the decode block 1314 shown in FIG. 13C.

In addition to the two sub-layers (i.e., the sublayer with multi-head attention block 1322 and the sub-layer with feed forward block 1326) found in encode block 1310, decode block 1314 can include a third sub-layer, which performs multi-head attention over the output of the encoder stack. The result from the encoder 1328 can be input into the multi-head attention block 1322. Similar to encoder 1308, decoder 1312 uses residual connections around each of the sub-layers, followed by layer normalization. Additionally, the sub-layer with multi-head attention block 1322 can be modified in the decoder stack to prevent positions from attending to subsequent positions. This masking, combined with the fact that the output embeddings are offset by one position, can ensure that the predictions for position i can depend only on the known output data at positions less than i.

Linear block 1316 can be a learned linear transformation. For example, when transformer architecture 1300 is being used to translate from a first language into a second language, linear block 1316 can project the output from the last decode softmax block 1318 into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

Softmax block 1318 then turns the scores from linear block 1316 into output probabilities 1320 (which add up to 1.0). In each position, the index provides for the word with the highest probability, and then maps that index to the corresponding word in the vocabulary. Those words then form the output sequence of transformer architecture 1300. The softmax operation is applied to the output from linear block 1316 to convert the raw numbers into output probabilities 1320 (e.g., token probabilities).

Figure 14:
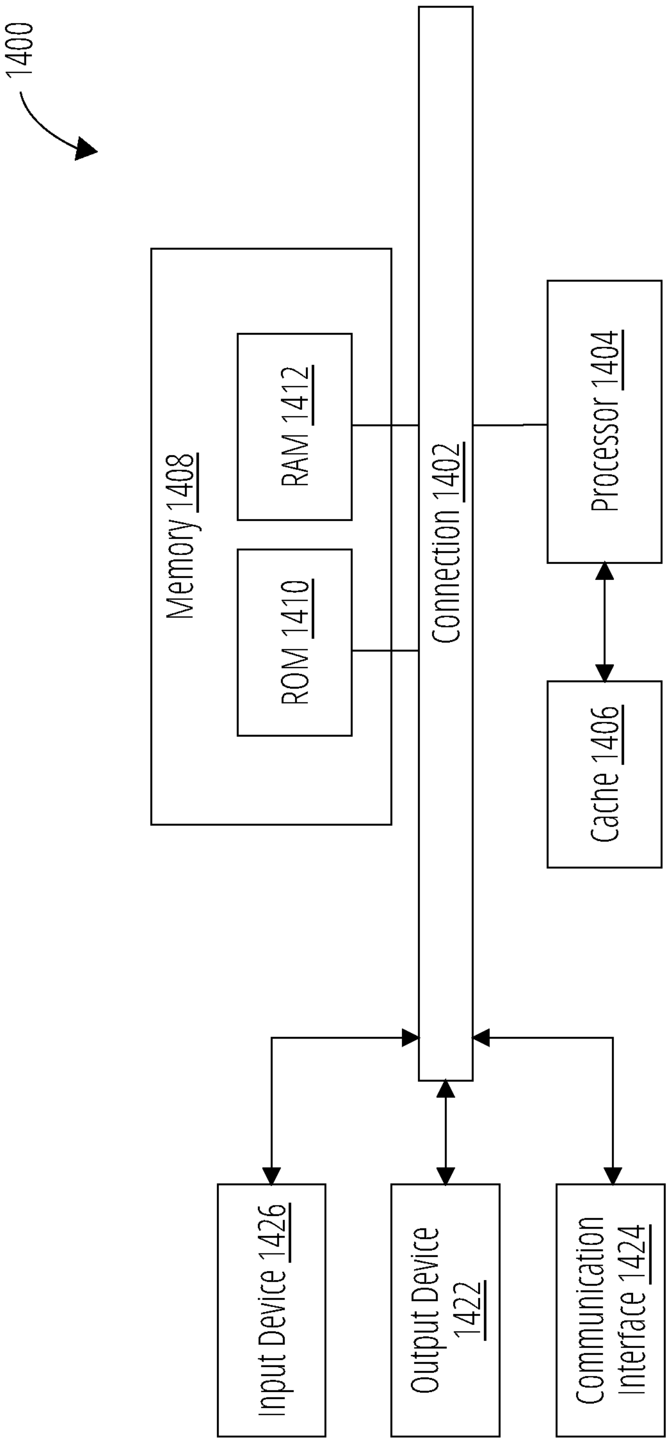
FIG. 14 shows an example of a system for implementing some aspects of the disclosure.

FIG. 14 shows an example of computing system 1400, which can be, for example, any computing device making up any engine illustrated in FIG. 1 or any component thereof.

In some aspects, computing system 1400 is a single device, or a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

In some aspects, computing system 1400 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 1400 includes at least one processing unit (CPU or processor) 1404 and connection 1402 that couples various system components including system memory 1408, such as read-only memory (ROM) 1410 and random access memory (RAM) 1412 to processor 1404. Memory 1408 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Memory 1408 can include software services, servers, logic, etc., that when the code that defines such software is executed by the processor 1404, it causes the system to perform a function. In some aspects, a hardware service that performs a particular function can include the software component stored in a computer-readable medium in connection with the necessary hardware components, such as processor 1404, connection 1402, output device 1422, etc., to carry out the function.

Computing system 1400 can include a cache of high-speed memory 1406 connected directly with, in close proximity to, or integrated as part of processor 1404.

Connection 1402 can be a physical connection via a bus, or a direct connection into processor 1404, such as in a chipset architecture. Connection 1402 can also be a virtual connection, networked connection, or logical connection.

Processor 1404 can include any general purpose processor and a hardware service or software service stored in memory 1408, configured to control processor 1404 as well as a special-purpose processor where software instructions are incorporated into the actual processor design. Processor 1404 may essentially be a completely self-contained computing system, containing multiple cores or processors, a bus, memory controller, cache, etc. A multi-core processor may be symmetric or asymmetric. Processor 1404 can be physical or virtual.

To enable user interaction, computing system 1400 includes an input device 1426, which can represent any number of input mechanisms, such as a microphone for speech, a touch-sensitive screen for gesture or graphical input, keyboard, mouse, motion input, speech, etc. Computing system 1400 can also include output device 1422, which can be one or more of a number of output mechanisms known to those of skill in the art. In some instances, multimodal systems can enable a user to provide multiple types of input/output to communicate with computing system 1400. Computing system 1400 can include communication interface 1424, which can generally govern and manage the user input and system output. There is no restriction on operating on any particular hardware arrangement, and therefore the basic features here may easily be substituted for improved hardware or firmware arrangements as they are developed.

In some aspects, computing system 1400 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from non-transitory computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of non-transitory computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects:

The present technology includes computer-readable storage mediums for storing instructions, and systems for executing any one of the methods embodied in the instructions addressed in the aspects of the present technology presented below:

Aspect 1: A method comprising: receiving, by a generative response engine, a prompt that defines an agentic task to compose a spreadsheet content item, wherein the agentic task is one in which the generative response engine performs an action as an agent of a user account and wherein the action involves using a spreadsheet tool; composing the spreadsheet content item, by the generative response engine, by invoking one or more high-intent operations that are provided to the spreadsheet tool, wherein the one or more high-intent operations specify respective semantic editing operations for spreadsheets that correspond to human user editing actions, wherein the one or more high-intent operations are function calls that cause the spreadsheet tool to apply a transformation to a spreadsheet file that corresponds to a high-intent function call, wherein the one or more high-intent operations include editing operations on a sheet, a cell, or ranges in the spreadsheet content item, wherein the one or more high-intent operations include using a model-optimized interface for spreadsheet editing; and iteratively repeating, by the generative response engine, invoking of the one or more high-intent operations until the agentic task is complete.

Aspect 2: The method of aspect 1, further comprising: causing display, by the generative response engine, the spreadsheet content item when the agentic task is complete.

Aspect 3: The method of any of aspects 1 and 2, wherein the spreadsheet content item is displayed in an intermediate spreadsheet representation that is a structured workbook representation with nodes representing sheets and a plurality of cells, each of the plurality of cells is respectively associated with cell attributes that include one or more of a cell value, a cell formula, or a cell format and wherein the intermediate spreadsheet representation is natively manipulatable by the generative response engine.

Aspect 4: The method of any of aspects 1-3, further comprising: causing to export, by the generative response engine, the spreadsheet content item as an output spreadsheet file in a spreadsheet format type.

Aspect 5: The method of any of aspects 1-4, wherein exporting the spreadsheet content item is inhibited until a formula validation and a visual validation are satisfied.

Aspect 6: The method of any of aspects 1-5, wherein iteratively repeating further includes: iteratively repeating rendering, calculating a formula, performing a visual inspection and applying additional high-intent operations until the formula constraint and the visual constraint are satisfied.

Aspect 7: The method of any of aspects 1-6, further comprising: performing a verification process including analyzing one or more cell formulas to determine one or more calculated values and associating the one or more calculated values with corresponding cells as cached results, wherein the verification process includes rendering the spreadsheet content item to an image so that the generative response engine visually analyzes formatting and layout of the spreadsheet content item for correctness.

Aspect 8: The method of any of aspects 1-7, wherein the verification process further includes determining whether the one or more cell formulas satisfy a stored set of spreadsheet specific constraints, wherein the stored set of spreadsheet specific constraints indicates that derived values be expressed using spreadsheet formulas rather than hardcoded values.

Aspect 9: The method of any of aspects 1-8, wherein the stored set of spreadsheet specific constraints further includes one or more of: prohibiting use of a dynamic array function, prohibiting use of a volatile function, indicating that the spreadsheet formulas is to satisfy a readability criterion based on at least one of: a formula length, a formula complexity score, or use of intermediate calculation cells, or indicating a number formatting constraint including at least one of: a currency formatting, a percentage formatting, a date formatting, or a negative-number formatting.

Aspect 10: The method of any of aspects 1-9, wherein the spreadsheet tool includes a spreadsheet artifact library that exposes the one or more high-intent operations for creating worksheets and addressing a plurality of cells in the spreadsheet content item.

Aspect 11: The method of any of aspects 1-10, further comprising: generating an ordered log of the one or more high-intent operations; and converting the ordered log into a human-readable change description, which is to be rendered to a user via a user interface indicating changes made to the spreadsheet content item by the generative response engine.

Aspect 12: The method of any of aspects 1-11, further comprising: inserting, into the spreadsheet content item, at least one note or comment associated with a cell to store a citation corresponding to a value in the cell or a citations column adjacent to a table region such that rows in a table region have a corresponding citation entry.

Aspect 13: The method of any of aspects 1-12, further comprising: creating a change log worksheet that includes at least one row describing modifications performed by the generative response engine.

Aspect 14: The method of any of aspects 1-13, further comprising: applying, in response to concurrent edits by a user and the generative response engine, operation-based differences in an order determined to resolve a conflict between edits to a same cell or range in the spreadsheet content item.

Aspect 15: A method comprising: receiving, by a generative response engine, a prompt that defines an agentic task to compose a spreadsheet content item, wherein the agentic task is one in which the generative response engine performs an action as an agent of a user account, wherein the action involves using a spreadsheet artifact tool, wherein composing the spreadsheet content item includes creating or editing the spreadsheet content item; and performing, by the generative response engine, the agentic task to compose the spreadsheet content item using one or more spreadsheet editing operations, wherein performing the agentic task includes: recalculating spreadsheet formulas in the spreadsheet content item after one or more spreadsheet editing operations to produce recalculation results; detecting based on the recalculation results, one or more formula errors in the spreadsheet content item, wherein the one or more formula errors include at least one of: a formula evaluation error, a reference error, a divide-by-zero error, and an inconsistent-range error; and responsive to detecting the one or more formula errors, generating and applying, by the generative response engine, one or more additional spreadsheet editing operations that modify at least one of cell values, cell formulas, or cell formatting to correct the one or more formula errors.

Aspect 16: The method of aspect 15, further comprising: obtaining an image that depicts at least a modified portion of the spreadsheet content item; determining whether the modified portion of the spreadsheet content item satisfies visual validation constraints; and generating and applying one or more additional high-intent spreadsheet editing operations based on determining that the modified portion of the spreadsheet content item does not satisfy the visual validation constraints.

Aspect 17: The method of any of aspects 15 and 16, wherein obtaining the image includes obtaining one or more images depicting a full worksheet of the spreadsheet content item including visible cell borders, row and column layout, and formatted headers.

Aspect 18: The method of any of aspects 15-17, wherein the visual validation constraints includes a first constraint requiring a presence of a title region and at least one border delineating a section boundary, a second constraint requiring consistent formatting across multiple worksheets of the spreadsheet content item, a third constraint requiring a visual distinction between input cells and derived cells, and/or a fourth constraint requiring that number formats render as currency, percent, or dates rather than unformatted numbers for corresponding data types.

Aspect 19: The method of any of aspects 15-18, wherein performing the agentic task further includes: generating and applying one or more high-intent spreadsheet editing operations that include creating a conditional formatting rule applied to at least one range of the spreadsheet content item, wherein the conditional formatting rule includes a formula-based condition.

Aspect 20: The method of any of aspects 15-19, further comprising: inserting, into the spreadsheet content item, at least one note or comment associated with a cell to store a citation corresponding to a value in the cell or a citations column adjacent to a table region such that rows in the table region have a corresponding citation entry.

Aspect 21: The method of any of aspects 15-20, wherein recalculating is performed automatically after each high-intent spreadsheet editing operation that modifies at least one cell formula or after a batch of high-intent spreadsheet editing operations that collectively modify a range of cells.

Aspect 22: The method of any of aspects 15-21, wherein the spreadsheet content item is generated such that derived values are represented using the spreadsheet formulas rather than hard-coded values.

Aspect 23: The method of any of aspects 15-22, wherein the spreadsheet formulas are human-editable formulas.

Aspect 24: The method of any of aspects 15-23, further comprising: enforcing a stored formula readability policy requiring the spreadsheet formulas to satisfy a readability criterion, wherein the readability criterion includes a maximum formula length threshold, a maximum number of nested functions in a formula, a maximum parse-tree depth of a formula, and/or a maximum count of operators, function calls, or cell-range references per the formula.

What is claimed is:

1. A method comprising:

receiving, by a generative response engine, a prompt that defines an agentic task to compose a spreadsheet content item; and performing, by the generative response engine, the agentic task to compose the spreadsheet content item using one or more spreadsheet editing operations, wherein performing the agentic task includes:

recalculating spreadsheet formulas in the spreadsheet content item after one or more spreadsheet editing operations to produce recalculation results;

detecting based on the recalculation results, one or more formula errors in the spreadsheet content item; and responsive to detecting the one or more formula errors, generating and applying, by the generative response engine, one or more additional spreadsheet editing operations that modify at least one of cell values, cell formulas, or cell formatting to correct the one or more formula errors.

2. The method of claim 1, further comprising:

obtaining an image that depicts at least a modified portion of the spreadsheet content item;

determining whether the modified portion of the spreadsheet content item satisfies visual validation constraints; and generating and applying one or more additional high-intent spreadsheet editing operations based on determining that the modified portion of the spreadsheet content item does not satisfy the visual validation constraints.

3. The method of claim 2, wherein obtaining the image includes obtaining one or more images depicting a full worksheet of the spreadsheet content item including visible cell borders, row and column layout, and formatted headers.

4. The method of claim 2, wherein the visual validation constraints includes a first constraint requiring a presence of a title region and at least one border delineating a section boundary, a second constraint requiring consistent formatting across multiple worksheets of the spreadsheet content item, a third constraint requiring a visual distinction between input cells and derived cells, and/or a fourth constraint requiring that number formats render as currency, percent, or dates rather than unformatted numbers for corresponding data types.

5. The method of claim 1, wherein performing the agentic task further includes:

generating and applying one or more high-intent spreadsheet editing operations that include creating a conditional formatting rule applied to at least one range of the spreadsheet content item, wherein the conditional formatting rule includes a formula-based condition.

6. The method of claim 1, further comprising:

inserting, into the spreadsheet content item, at least one note or comment associated with a cell to store a citation corresponding to a value in the cell or a citations column adjacent to a table region such that rows in the table region have a corresponding citation entry.

7. The method of claim 1, wherein recalculating is performed automatically after each high-intent spreadsheet editing operation that modifies at least one cell formula or after a batch of high-intent spreadsheet editing operations that collectively modify a range of cells.

8. The method of claim 1, wherein the spreadsheet content item is generated such that derived values are represented using the spreadsheet formulas rather than hard-coded values.

9. The method of claim 1, wherein the spreadsheet formulas are human-editable formulas.

10. The method of claim 1, further comprising:

enforcing a stored formula readability policy requiring the spreadsheet formulas to satisfy a readability criterion, wherein the readability criterion includes a maximum formula length threshold, a maximum number of nested functions in a formula, a maximum parse-tree depth of a formula, and/or a maximum count of operators, function calls, or cell-range references per the formula.

11. A computing system comprising:

at least one processor; and a memory storing instructions that, when executed by the at least one processor, configure the computing system to:

receive, by a generative response engine, a prompt that defines an agentic task to compose a spreadsheet content item; and perform, by the generative response engine, the agentic task to compose the spreadsheet content item using one or more spreadsheet editing operations, wherein performing the agentic task includes:

recalculate spreadsheet formulas in the spreadsheet content item after one or more spreadsheet editing operations to produce recalculation results;

detect based on the recalculation results, one or more formula errors in the spreadsheet content item; and responsive to detecting the one or more formula errors, generate and apply, by the generative response engine, one or more additional spreadsheet editing operations that modify at least one of cell values, cell formulas, or cell formatting to correct the one or more formula errors.

12. The computing system of claim 11, wherein the instructions further configure the computing system to:

obtain an image that depicts at least a modified portion of the spreadsheet content item;

determine whether the modified portion of the spreadsheet content item satisfies visual validation constraints; and generate and apply one or more additional high-intent spreadsheet editing operations based on determining that the modified portion of the spreadsheet content item does not satisfy the visual validation constraints.

13. The computing system of claim 12, wherein the instructions further configure the computing system to obtain the image by obtaining one or more images depicting a full worksheet of the spreadsheet content item including visible cell borders, row and column layout, and formatted headers.

14. The computing system of claim 12, wherein the visual validation constraints includes a first constraint require a presence of a title region and at least one border delineating a section boundary, a second constraint requiring consistent formatting across multiple worksheets of the spreadsheet content item, a third constraint requiring a visual distinction between input cells and derived cells, and/or a fourth constraint requiring that number formats render as currency, percent, or dates rather than unformatted numbers for corresponding data types.

15. The computing system of claim 11, wherein the instructions further configure the computing system to perform the agentic task by:

generating and applying one or more high-intent spreadsheet editing operations that include creating a conditional formatting rule applied to at least one range of the spreadsheet content item, wherein the conditional formatting rule includes a formula-based condition.

16. A non-transitory computer-readable storage medium, the non-transitory computer-readable storage medium including instructions that when executed by a computer, cause the computer to:

receive, by a generative response engine, a prompt that defines an agentic task to compose a spreadsheet content item; and perform, by the generative response engine, the agentic task to compose the spreadsheet content item using one or more spreadsheet editing operations, wherein performing the agentic task includes:

recalculate spreadsheet formulas in the spreadsheet content item after one or more spreadsheet editing operations to produce recalculation results;

detect based on the recalculation results, one or more formula errors in the spreadsheet content item; and responsive to detecting the one or more formula errors, generate and apply, by the generative response engine, one or more additional spreadsheet editing operations that modify at least one of cell values, cell formulas, or cell formatting to correct the one or more formula errors.

17. The non-transitory computer-readable storage medium of claim 16, wherein the instructions further configure the computer to:

obtain an image that depicts at least a modified portion of the spreadsheet content item;

determine whether the modified portion of the spreadsheet content item satisfies visual validation constraints; and generate and apply one or more additional high-intent spreadsheet editing operations based on determining that the modified portion of the spreadsheet content item does not satisfy the visual validation constraints.

18. The non-transitory computer-readable storage medium of claim 17, wherein the instructions configure the computer to obtain the image by obtaining one or more images depicting a full worksheet of the spreadsheet content item including visible cell borders, row and column layout, and formatted headers.

19. The non-transitory computer-readable storage medium of claim 17, wherein the visual validation constraints includes a first constraint require a presence of a title region and at least one border delineating a section boundary, a second constraint requiring consistent formatting across multiple worksheets of the spreadsheet content item, a third constraint requiring a visual distinction between input cells and derived cells, and/or a fourth constraint requiring that number formats render as currency, percent, or dates rather than unformatted numbers for corresponding data types.

20. The non-transitory computer-readable storage medium of claim 16, wherein the instructions configure the computer to perform the agentic task further by:

generating and applying one or more high-intent spreadsheet editing operations that include creating a conditional formatting rule applied to at least one range of the spreadsheet content item, wherein the conditional formatting rule includes a formula-based condition.

* * * * *